(12) United States Patent
Huang et al.

(10) Patent No.: US 10,474,925 B2
(45) Date of Patent: Nov. 12, 2019

(54) DEEP NEURAL NETWORK WITH SIDE BRANCHES FOR RECOGNIZING AND CLASSIFYING MEDIA DATA AND METHOD FOR USING THE SAME

(71) Applicant: INDUSTRIAL TECHNOLOGY RESEARCH INSTITUTE, Hsinchu County (TW)

(72) Inventors: Mao-Yu Huang, Yunlin County (TW); Ching-Hao Lai, Taichung (TW)

(73) Assignee: INDUSTRIAL TECHNOLOGY RESEARCH INSTITUTE, Zhudong Township (TW)

( * ) Notice: Subject to any disclaimer, the term of this patent is extended or adjusted under 35 U.S.C. 154(b) by 219 days.

(21) Appl. No.: 15/793,086

(22) Filed: Oct. 25, 2017

(65) Prior Publication Data

US 2019/0034761 A1    Jan. 31, 2019

Related U.S. Application Data

(60) Provisional application No. 62/538,811, filed on Jul. 31, 2017.

(51) Int. Cl.
*G06K 9/62*      (2006.01)
*G06N 3/02*     (2006.01)

(52) U.S. Cl.
CPC ......... *G06K 9/6227* (2013.01); *G06K 9/6202* (2013.01); *G06N 3/02* (2013.01); *G06T 2207/10028* (2013.01)

(58) Field of Classification Search
None
See application file for complete search history.

(56) References Cited

U.S. PATENT DOCUMENTS 7,280,987 B2    10/2007   Chen et al.
9,524,450 B2    12/2016   Ravindran et al.
(Continued)

FOREIGN PATENT DOCUMENTS

CN    104537393 A    4/2015
CN    106960243 A    7/2017
(Continued)

OTHER PUBLICATIONS

Guo et al., "The shallow end: Empowering shallower deep-convolutional networks through auxiliary outputs." arXiv preprint arXiv:1611.01773 (2016). (Year: 2016).*
(Continued)

*Primary Examiner* — Feng Niu
(74) *Attorney, Agent, or Firm* — Birch, Stewart, Kolasch & Birch, LLP

(57) ABSTRACT

A deep neural network and a method for recognizing and classifying a multimedia data as one of a plurality of pre-determined data classes with enhanced recognition and classification accuracy and efficiency are provided. The use of the side branch(es) (or sub-side branch(es), sub-sub-side branch(es), and so on) extending from the main branch (or side branch(es), sub-side branch(es), and so on), the sequential decision making mechanism, and the collaborating (fusing) decision making mechanism in a deep neural network would equip a deep neural network with the capability for fast forward inference so as to enhance recognition and classification accuracy and efficiency of the deep neural network.

42 Claims, 22 Drawing Sheets

(56) References Cited

U.S. PATENT DOCUMENTS

| | | | |
|---|---|---|---|
| 2015/0213302 A1 | 7/2015 | Madabhushi et al. | |
| 2016/0180195 A1 | 6/2016 | Martinson et al. | |
| 2016/0350649 A1 | 12/2016 | Zhang et al. | |
| 2017/0014253 A1 | 1/2017 | Kelleher et al. | |
| 2017/0147905 A1 | 5/2017 | Huang et al. | |
| 2018/0211109 A1* | 7/2018 | Wang | G06K 9/00442 |

FOREIGN PATENT DOCUMENTS

| | | |
|---|---|---|
| CN | 106980895 A | 7/2017 |
| TW | 201706871 A | 2/2017 |

OTHER PUBLICATIONS

Li et al., "Ternary weight networks." arXiv preprint arXiv:1605.04711. May 16, 2016. (Year: 2016).*

Sarraf et al., "Deep learning-based pipeline to recognize Alzheimer's disease using fMRI data." In 2016 Future Technologies Conference (FTC), pp. 816-820. IEEE, 2016. (Year: 2016).*

Wu et al., "Deep learning for video classification and captioning." arXiv preprint arXiv:1609.06782. Sep. 22, 2016. (Year: 2016).*

Du et al., "Overview of deep learning." In 2016 31st Youth Academic Annual Conference of Chinese Association of Automation (YAC), pp. 159-164. IEEE, 2016. (Year: 2016).*

Wang et al., "On the origin of deep learning." arXiv preprint arXiv:1702.07800. Feb. 24, 2017. (Year: 2017).*

Zhang et al., "An effective convolutional neural network model for Chinese sentiment analysis." In AIP Conference Proceedings, vol. 1836, No. 1, p. 020085. AIP Publishing, Jun. 2017. (Year: 2017).*

LeCun et al., "Gradient-based learning applied to document recognition." Proceedings of the IEEE, 86(11): 2278-2324, 1998 (Year: 1998).*

Krizhevsky et al., "Imagenet classification with deep convolutional neural networks." In Advances in neural information processing systems, pp. 1097{1105, 2012. (Year: 2012).*

Teerapittayanon et al., "Distributed deep neural networks over the cloud, the edge and end devices." In 2017 IEEE 37th International Conference on Distributed Computing Systems (ICDCS), pp. 328-339. IEEE, Jun. 2017. (Year: 2017).*

He et al., "Deep residual learning for image recognition," arXiv preprint arXiv:1512.03385, 2015. (Year: 2015).*

Taiwanese Office Action and Search Report for Taiwanese Application No. 106146091, dated May 30, 2018.

Lee et al.; "Deeply-Supervised Nets"; AISTATS 2015, vol. 38, pp. 562-570.

Szegedy et al.; "Going Deeper with Convolutions"; CVPR 2015; pp. 1-9.

Teerapittayanon et al.; "Branchy Net: Fast Inference via Early Exiting from Terrapittayanon et al.; Deep Neural Networks"; ICPR Dec. 4, 2016; pp. 2464-2469.

Wang et al.; "Deeply-Fused Nets"; arXiv May 25, 2016; pp. 1-16.

Wang et al.; "Training Deeper Convolutional Networks with Deep Supervision"; arXiv May 11, 2015; pp. 1-6.

* cited by examiner and classifying a media data as one of a plurality of pre-determined data classes with enhanced recognition and classification accuracy and efficiency.

DEEP NEURAL NETWORK WITH SIDE BRANCHES FOR RECOGNIZING AND CLASSIFYING MEDIA DATA AND METHOD FOR USING THE SAME

CROSS-REFERENCE TO RELATED APPLICATIONS

This nonprovisional application claims priority under 35 U.S.C. § 119(e) on U.S. Provisional Patent Application No. 62/538,811, filed on Jul. 31, 2017, the entirety of which is incorporated herein by reference.

TECHNICAL FIELD

The present application relates to a deep neural network (DNN).

BACKGROUND

Neural networks have been designed for a plurality of applications. For example, neural networks have been designed to extract features from data such as images, sound, video, text or time series, to recognize patterns of the data. Neural networks are modeled as collections of neurons that are connected in an acyclic graph. In other words, the outputs of some neurons can become inputs to other neurons. Neural network models are often organized into distinct layers of neurons. Different layers may perform different kinds of transformations on their inputs. Signals travel from the first (input) layer, to the last (output) layer, possibly after traversing several hidden layers thereinbetween.

In deep neural networks (i.e., the neural networks with a plurality of hidden layers), each layer of neurons trains on a distinct set of features based on the previous layer's output. A neuron combines input (for example, a vector) from the data with a set of weights (for example, matrix), that either amplify or dampen that input, thereby assigning significance to inputs for the task the algorithm is trying to learn. These input-weight products are summed and the sum is passed through an activation function (e.g., Sigmoid, Tan h, ReLU, Leaky ReLU, Maxout, TLDR. etc.), to determine whether and to what extent that signal progresses further through the network to affect the ultimate outcome (e.g., an act of classification). Pairing adjustable weights with input features is how the significance is assigned to these features with regard to how the network classifies and clusters input. This feature hierarchy of increasing complexity and abstraction makes deep neural networks capable of handling very large, high-dimensional data sets with billions of parameters that pass through nonlinear functions to perform automatic feature extraction without human intervention. Deep neural networks may end in an output layer such as a logistic or softmax classifier that assigns a likelihood to a particular outcome or label. Given raw data in the form of an image, a deep neural network may predict/decide, for example, that the input data is likely to represent a person, a cat, a horse, etc. at a certain percentage.

For example, Convolutional Neutral Networks (CNN) are one type of deep neural networks, which have demonstrated its power in many image recognition tasks. Although one may increase the network size, including depth and width, to achieve higher accuracy of image recognition, this comes at the expense of much more latency for forward inference. For example, benchmarks for popular CNN models on ImageNet dataset show that the latency at test time has been increased from 7.0 milliseconds (ms) (AlexNet), to 109.32 ms (ResNet) in order to reduce the top-1 error from 42.90% to 22.16%. Therefore, how to achieve higher recognition and classification accuracy without sacrificing the efficiency of the deep neural network becomes an important issue to address.

SUMMARY

Accordingly, it is an object of the present application to provide a deep neural network and a method for recognizing and classifying a media data as one of a plurality of pre-determined data classes with enhanced recognition and classification accuracy and efficiency.

To achieve the above-mentioned object, according to a first aspect of the present application, a deep neural network for recognizing and classifying a media data as one of a plurality of pre-determined data classes with enhanced recognition and classification accuracy and efficiency is provided. The deep neural network comprises: a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer; at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \leq Y < X$; a fusion layer, wherein the classification layer of the main path and the classification layer of the at least one alternative path merge at the fusion layer; and a predictor configured to recognize and classify the media data as one of the plurality of pre-determined data classes corresponding to a final class likelihood, wherein the deep neural network directs the media data sequentially through one or more of the at least one alternative path and the main path one at a time until the final class likelihood is outputted, and outputs either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood.

Furthermore, according to a second aspect of the present application, a method for recognizing and classifying a media data as one of a plurality of pre-determined data classes with enhanced recognition and classification accuracy and efficiency using a deep neural network is provided. The deep neural network comprises: a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer; at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \leq Y < X$; a fusion layer, wherein the classification layer of the main path and the classification layer of the at least one alternative path merge at the fusion layer; and a predictor configured to recognize and classify the media data as one of the plurality of pre-determined data classes corresponding to a final class likelihood. The method comprises: directing the media data sequentially through one or more of the at least one alternative path and the main path one at a time until the final class likelihood is outputted; outputting either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood; and recognizing and classifying the media data as one of the plurality of pre-determined data classes corresponding to the final class likelihood.

Still furthermore, according to a third aspect of the present application, a non-transitory computer-readable medium containing a computer program product comprising computer-executable instructions for recognizing and classifying a media data as one of a plurality of pre-determined data classes with enhanced recognition and classification accuracy and efficiency using a deep neural network is provided. The deep neural network comprises: a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer; at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \leq Y < X$; a fusion layer, wherein the classification layer of the main path and the classification layer of the at least one alternative path merge at the fusion layer; and a predictor configured to recognize and classify the media data as one of the plurality of pre-determined data classes corresponding to a final class likelihood. The computer program product comprises the computer-executable instructions for: directing the media data sequentially through one or more of the at least one alternative path and the main path one at a time until the final class likelihood is outputted; outputting either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood; and recognizing and classifying the media data as one of the plurality of pre-determined data classes corresponding to the final class likelihood.

Further scope of applicability of the present application will become apparent from the detailed description given hereinafter. However, it should be understood that the detailed description and specific examples, while indicating preferred embodiments of the application, are given by way of illustration only, since various changes and modifications within the spirit and scope of the invention will become apparent to those skilled in the art from this detailed description.

BRIEF DESCRIPTION OF THE DRAWINGS

The present application will become more fully understood from the detailed description given hereinbelow and the accompanying drawings which are given by way of illustration only, and thus are not limitative of the present application, and wherein.

DETAILED DESCRIPTION OF THE ILLUSTRATED EMBODIMENTS

Figure 1:
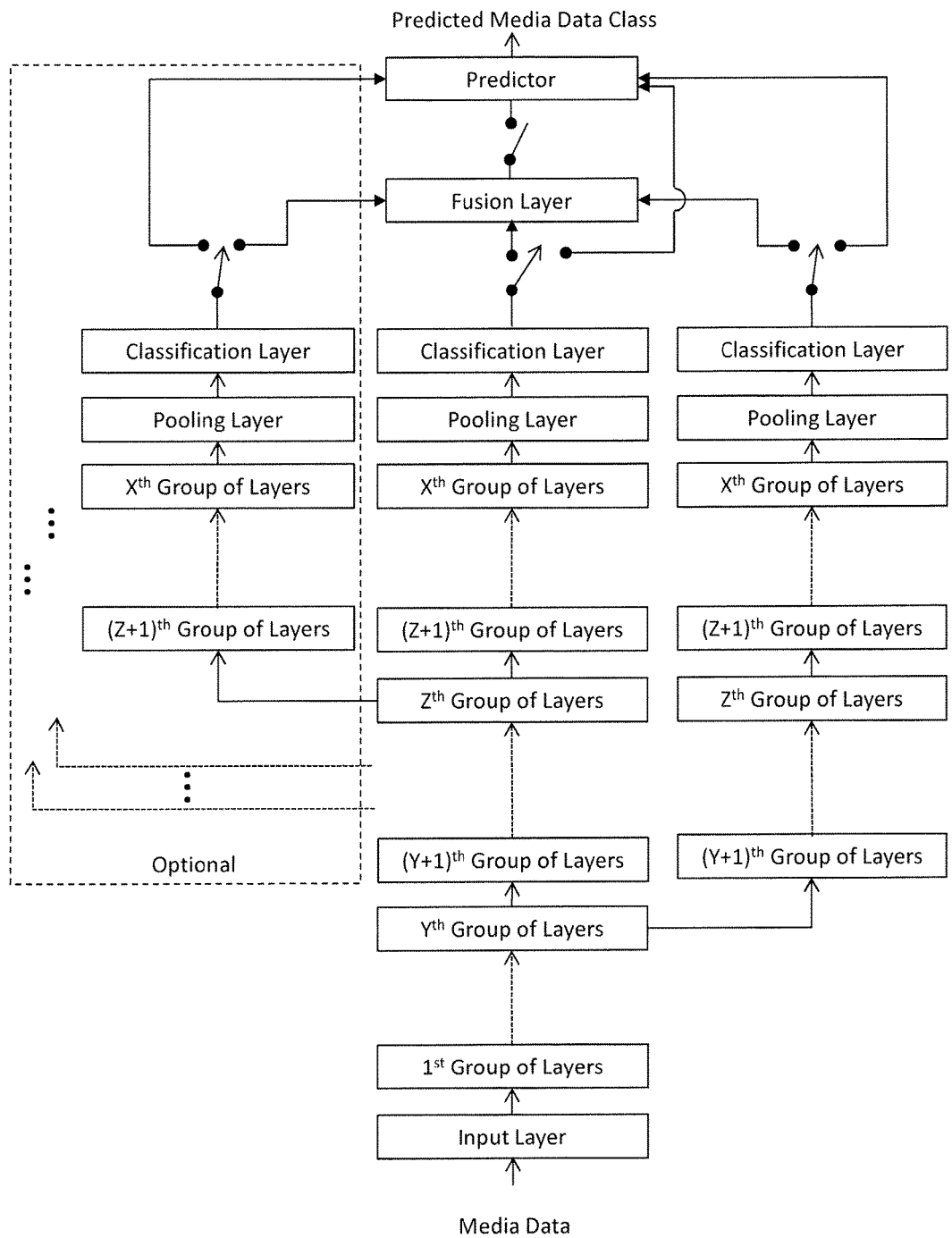
FIG. 1 illustrates a deep neutral network in accordance with an embodiment of the present application.

The present application will now be described in detail with reference to the accompanying drawings, wherein the same reference numerals will be used to identify the same or similar elements throughout the several views. It should be noted that the drawings should be viewed in the direction of orientation of the reference numerals.

In an embodiment of the present application, a deep neutral network includes a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer; at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \leq Y < X$; a fusion layer, wherein the classification layer of the main path and the classification layer of the at least one alternative path merge at the fusion layer; and a predictor configured to recognize and classify the media data as one of the plurality of pre-determined data classes corresponding to a final class likelihood. The deep neural network directs the media data sequentially through one or more of the at least one alternative path and the main path one at a time until the final class likelihood is outputted, and outputs either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood.

In an embodiment, the deep neutral network is computer-implemented and is executed by a processor of a computer or a processor of an electronic device to recognize and classify the media data.

In an embodiment, the deep neural network does not direct the media data through the main path until the deep neural network has directed the media data sequentially through each of at least one alternative path.

In an embodiment, the at least one alternative path includes a plurality of alternative paths, the deep neural network does not direct the media data through the main path until the deep neural network has directed the media data sequentially through each of the plurality of alternative paths, and the deep neural network directs the media data sequentially through the plurality of alternative paths in a descending order of a length of the side branch of each of the plurality of alternative paths, and the length of the side branch of each of the plurality of alternative paths is a total number of the additional X-Y groups of layers of each of the plurality of alternative paths.

In an embodiment, when the deep neural network outputs the final class likelihood, the deep neural network stops directing the media data through rest of the at least one alternative path and the main path.

In an embodiment, the fuse layer computes a current fused class likelihood of the two or more of any of the main path and the at least one alternative path that the media data has been directed through for each of the plurality of pre-determined data classes only when the highest class likelihood of a current one of the at least one alternative path and the main path that the media data has been directed through does not reach or exceed the corresponding class likelihood threshold, and the fuse layer computes a next fused class likelihood of two or more of any of the main path and the at least one alternative path has been directed through for each of the plurality of pre-determined data classes only when the highest class likelihood of a next one of the at least one alternative path and the main path that the media data has been directed through does not reach or exceed the corresponding class likelihood threshold.

In an embodiment, the deep neural network directs the media data through the next one of the at least one alternative path and the main path when the current fused class likelihood of the two or more of any of the main path and the at least one alternative path has been directed through for each of the plurality of pre-determined data classes does not reach or exceed a corresponding class likelihood threshold, and the current one of the at least one alternative path extends from a $C^{th}$ group of layers of the X groups of layers of the main path, and the deep neural network directs the media data through the next one of the at least one alternative path and the main path by redirecting data outputted from the $C^{th}$ group of layers of the X groups of layers of the main path into a $(C+1)^{th}$ group of layers of the X groups of layers of the main path and then through rest of the layers of the next one of the at least one alternative path and the main path, wherein C is one of the respective Y of all of the at least one alternative path.

In an embodiment, the fusion layer computes the current fused class likelihood of the two or more of the at least one alternative path and the main path using one of (a) for each of the plurality of pre-determined data classes, averaging the class likelihoods from the two or more of the at least one alternative path and the main path with a same weight on the class likelihoods from the two or more of the at least one alternative path and the main path;

(b) for each of the plurality of pre-determined data classes, averaging the class likelihoods from the two or more of the at least one alternative path and the main path with respective weights on the class likelihoods from the two or more of the at least one alternative path and the main path;

(c) for each of the plurality of pre-determined data classes, selecting a maximum class likelihood from the class likelihoods from the two or more of the at least one alternative path and the main path;

(d) for each of the plurality of pre-determined data classes, randomly selecting a class likelihood from the class likelihoods from the two or more of the at least one alternative path and the main path; and (e) for each of the plurality of pre-determined data classes, randomly dropping a predetermined number of the class likelihoods from the two or more of the at least one alternative path and the main path, and then performing one of (a)-(d).

In an embodiment, the class likelihood is represented in a form of a probability or a class score.

In an embodiment, the deep neural network outputs the highest fused class likelihood from the fusion layer as the final class likelihood only when the highest class likelihood of any previous one(s) of the at least one alternative path and the main path that the media data has been directed through does not reach or exceed the corresponding class likelihood threshold.

In an embodiment, the deep neural network outputs the highest fused class likelihood from the fusion layer as the final class likelihood only when the highest fused class likelihood reaches or exceeds a corresponding fused class likelihood threshold thereof or the deep neural network has directed the media data through each of the at least one alternative path and the main path.

In an embodiment, a total number of the layers in the X groups in any of the at least one alternative path is different from a total number of the layers of the X groups of layer in the main path.

In an embodiment, the total number of the layers in the X groups in any of the at least one alternative path is smaller than a total number of the layers of the X groups of layer in the main path.

In an embodiment, a total number of the layers of an $N^{th}$ group of layers in at least one of the at least one alternative path is smaller than a total number of the layers of an $N^{th}$ group of layers in the main path, and wherein N>Y and N is an integer of at least one of Y+1, Y+2, ..., X.

In an embodiment, each layer in each of the main path and the at least one alternative path includes a plurality of filters, and a total number of the filters of the X groups of layers in any of the at least one alternative path is different from a total number of the filters of the X groups of layers in the main path.

In an embodiment, the total number of the filters of the X groups of layers in any of the at least one alternative path is smaller than the total number of the filters of the X groups of layers in the main path.

In an embodiment, a total number of the filters of a $K^{th}$ group of layers in at least one of the at least one alternative path is smaller than a total number of the filters of a $K^{th}$ group of layers in the main path, and wherein K>Y and K is an integer of at least one of Y+1, Y+2, ..., X.

In an embodiment, each layer in the same group of layers in the main path has a same total number of filters, and each layer in the same group of layers in any of the at least one alternative path has a same total number of filters.

In an embodiment, the deep neural network is a convolutional neural network.

In an embodiment, the media data is a text data, a graphic data, an image data, an audio data, a video data, or any combination thereof.

In an embodiment, the media data is an image data or a video data showing a portion of a product to be inspected, and the plurality of pre-determined data classes include being defective and being non-defective.

In an embodiment, the at least one alternative path includes a plurality of alternative paths, and at least one sub-side branch with additional X-Y-W groups of layers extends from a respective $W^{th}$ group of the additional X-Y groups of layers of the side branch to form a part of another one of the at least one alternative path with the at least one sub-side branch, and wherein the respective W for each of the at least one sub-side branch is an integer and 1≤W<X-Y.

In an embodiment, the deep neural network does not direct the media data through the alternative path with the side branch until the deep neural network has directed the media data sequentially through each of at least one alternative path with the at least one sub-side branch.

In an embodiment, the at least one sub-side branch includes a plurality of sub-side branches that respectively form a part of a plurality of alternative paths with the sub-side branches, the deep neural network does not direct the media data through the alternative path with the side branch until the deep neural network has directed the media data sequentially through each of the plurality of alternative paths with the sub-side branches, and the deep neural network directs the media data sequentially through the plurality of alternative paths with the sub-side branches in a descending order of a length of the sub-side branch of each of the plurality of alternative paths with the sub-side branches, and the length of the sub-side branch of each of the plurality of alternative paths with the sub-side branches is a total number of the additional X-Y-W groups of layers of each of the plurality of alternative paths with the sub-side branches.

In an embodiment, the deep neural network directs the media data through a next one of the plurality of alternative paths with the sub-side branches and the alternative path with the side branch when the media data is through a current one of the plurality of alternative paths with the sub-side branches without outputting the final class likelihood, and the current one of the plurality of alternative paths with the sub-side branches extends from a $V^{th}$ group of layers of the X-Y groups of layers of the alternative path with the side branch, and the deep neural network directs the media data through the next one of the plurality of alternative paths with the sub-side branches and the alternative path with the side branch by redirecting data outputted from the $V^{th}$ group of layers of the X groups of layers of the alternative path with the side branch into a $(V+1)^{th}$ group of layers of the X groups of layers of the alternative path with the side branch and then through rest of the layers of the next one of the plurality of alternative paths with the sub-side branches and the alternative path with the side branch, wherein V is one of the respective W of all of the at least one sub-side branch.

In an embodiment, a method for recognizing and classifying a media data as one of a plurality of pre-determined data classes with enhanced recognition and classification accuracy and efficiency using a deep neural network is provided. The deep neural network comprises: a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer; at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \le Y < X$; a fusion layer, wherein the classification layer of the main path and the classification layer of the at least one alternative path merge at the fusion layer; and a predictor configured to recognize and classify the media data as one of the plurality of pre-determined data classes corresponding to a final class likelihood. The method comprises: directing the media data sequentially through one or more of the at least one alternative path and the main path one at a time until the final class likelihood is outputted; outputting either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood; and recognizing and classifying the media data as one of the plurality of pre-determined data classes corresponding to the final class likelihood.

In an embodiment, a non-transitory computer-readable medium containing a computer program product comprising computer-executable instructions for recognizing and classifying a media data as one of a plurality of pre-determined data classes with enhanced recognition and classification accuracy and efficiency using a deep neural network is provided. The deep neural network comprises: a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer; at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \le Y < X$; a fusion layer, wherein the classification layer of the main path and the classification layer of the at least one alternative path merge at the fusion layer; and a predictor configured to recognize and classify the media data as one of the plurality of pre-determined data classes corresponding to a final class likelihood. The computer program product comprises the computer-executable instructions for: directing the media data sequentially through one or more of the at least one alternative path and the main path one at a time until the final class likelihood is outputted; outputting either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood; and recognizing and classifying the media data as one of the plurality of pre-determined data classes corresponding to the final class likelihood.

As mentioned, although one may increase the network size, including depth and width, to achieve higher accuracy of image recognition, this comes at the expense of much more latency for forward inference. In order to achieve higher recognition and classification accuracy without sacrificing the efficiency of the deep neural network, a deep neural network with enhanced recognition and classification accuracy and efficiency is provided.

As will be explained in more detail using the following embodiments, in the enhanced deep neural network, in addition to the main path of a deep neural network, at least one side branch extending from the main path of the deep neural network is provided to form at least one alternative path for a possible faster forward inference time. In an embodiment, each of the at least one alternative path has a "complete but smaller" structure compared to the main path, which means that the at least one alternative path keeps the same number groups of layers as the main path (therefore "complete"), but may have a total less number of layers and/or a total less number of filters than the main path (therefore "smaller"). Because of the reduced number of layers and/or filters in the at least one alternative path (especially in the at least side branch), the computation time at the least one alternative path would be significantly reduced to achieve a faster forward inference time without the need to go through the entire main path (as well as the other alternative path(s)), if the highest class likelihood of the least one alternative path reaches or exceeds the class threshold likelihood to exit out of the deep neural network.

In addition, when there are a plurality of alternative paths, the media data will be sequentially through the plurality of "complete but smaller" alternative paths one at a time before going through the main path. As long as there is one (and the first-ever) alternative path with the highest class likelihood that reaches or exceeds the class threshold likelihood to exit out of the deep neural network, the deep neural network stops directing the media data through rest of the alternative paths and the main path. This sequential decision making mechanism also increases the chance to exit out of the deep neural network earlier.

Furthermore, in order to enhance the recognition and classification accuracy of the deep neural network, a collaborative decision making mechanism is also adopted to fuse the class likelihoods of two or more of any of the main path and the at least one alternative path that the media data has been directed through as the final class likelihood. Since the class likelihoods of two or more paths (either the main path or the alternative path(s)) are fused to calculate the final class likelihood, this collaborative decision making mechanism can improve recognition and classification accuracy of the deep neural network. In addition, when the class likelihoods of two or more paths are from the alternative paths, and the highest fused class likelihood reaches or exceeds the fused class threshold likelihood to exit out of the deep neural network, it is also possible to reduce the computation time and achieve a faster forward inference time, because there would be no need to go through the entire main path (and the other alternative path(s)).

Figure 2:
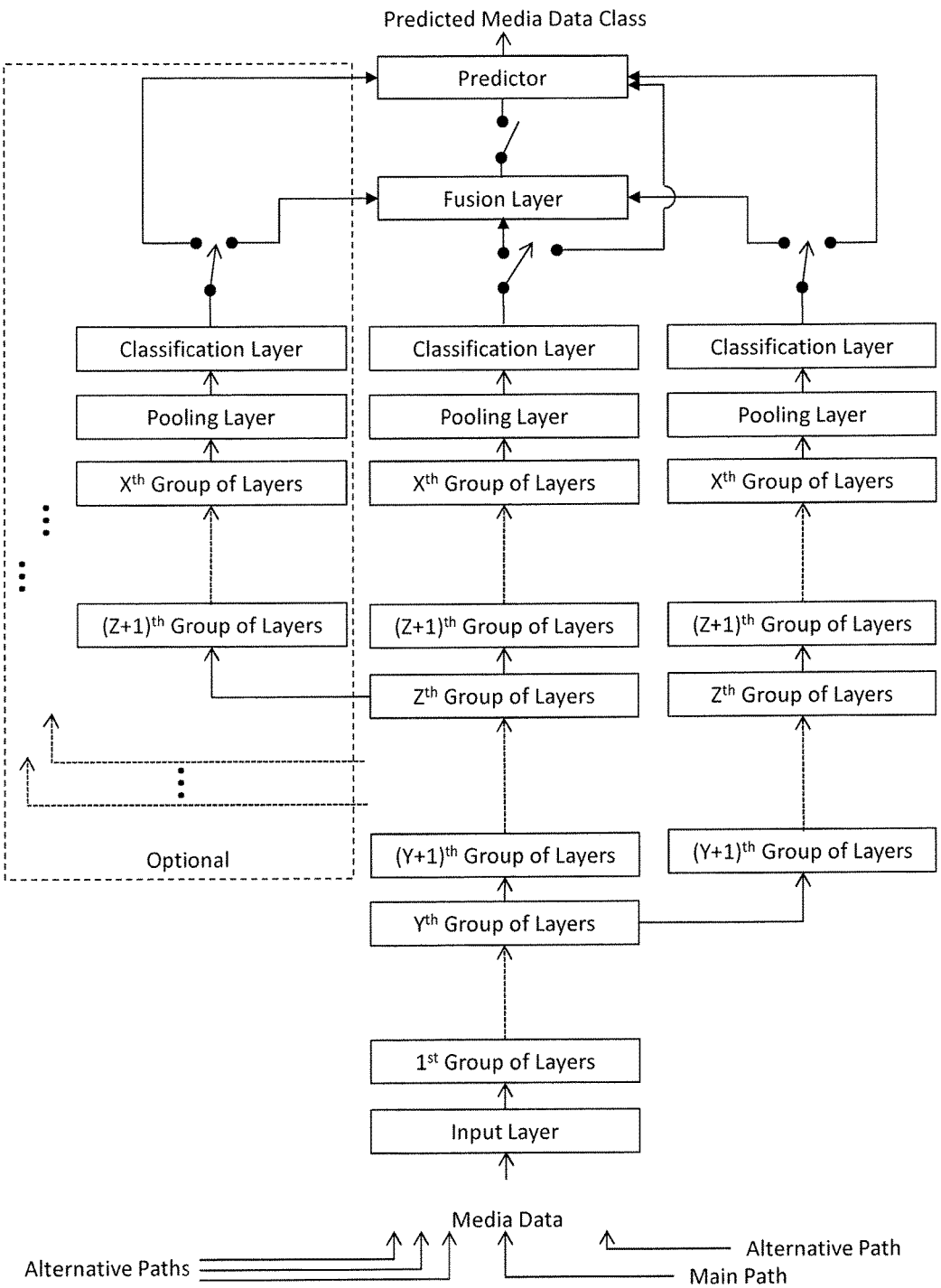
FIG. 2 illustrates the main path and some of the alternative paths of the deep neutral network as shown in FIG. 1.

FIG. 1. illustrates a deep neutral network in accordance with an embodiment of the present application, and FIG. 2 illustrates the main path and the alternative paths of a deep neutral network in accordance with an embodiment of the present application. As shown in FIGS. 1 and 2, there is main path in a sequential order of an input layer, only X groups of layers, a pooling layer, and a classification layer, wherein X>1 and X is an integer. In addition, there is an alternative path (the rightmost path as shown in FIGS. 1 and 2) in a sequential order of the input layer, only X groups of layers, a pooling layer, and a classification layer, wherein the X groups of layers in the rightmost alternative path consist of the first Y groups of the X groups of layers in the main path, and additional X-Y groups of layers (labeled as $(Y+1)^{th}$ group, ..., $X^{th}$ group) as a side branch extending from the $Y^{th}$ group of the X groups in the main path, and wherein Y is an integer and $1 \leq Y < X$. In other words, the first through the $Y^{th}$ group of layers of the main path are also the first through the $Y^{th}$ group of layers of the first alternative path, but the $(Y+1)^{th}$ through the $X^{th}$ group of layers of the first alternative path are different from the $(Y+1)^{th}$ through the $X^{th}$ group of layers of the main path. However, both the main path and the first alternative path have the same number (i.e., X) of groups of layers. In an embodiment, this alternative path has a total less number of layers and/or a total less number of filters than the main path. Therefore, this alternative path has a "complete but smaller" structure compared to the main path, because this alternative path keeps the same number (i.e., X) groups of layers as the main path, but have a total less number of layers and/or a total less number of filters than the main path.

In another embodiment, the deep neutral network may include more than one alternative path. For example, as shown in FIGS. 1 and 2, there is another alternative path in a sequential order of an input layer, only X groups of layers, a pooling layer, and a classification layer, wherein the X groups of layers in each of the alternative paths consist of the first Z groups of the X groups of layers in the main path, and additional X-Z groups of layers (labeled as $(Z+1)^{th}$ group, ..., $X^{th}$ group) as a side branch extending from the $Z^{th}$ group of the X groups in the main path, and wherein Z is an integer and $1 \leq Y < Z < X$.

In other words, the first through the $Z^{th}$ group of layers of the main path are also the first through the $Z^{th}$ group of layers of this alternative path, but the $(Z+1)^{th}$ through the $X^{th}$ group of layers of the first alternative path are different from the $(Z+1)^{th}$ through the $X^{th}$ group of layers of the main path. However, both the main path and this alternative path (as well as any other alternative path) have the same number (i.e., X) of groups of layers. In an embodiment, this alternative path (as well as any other alternative path) has a total less number of layers and/or a total less number of filters than the main path. Therefore, this alternative path (as well as any other alternative path) has a "complete but smaller" structure compared to the main path, because this alternative path keeps the same number (i.e., X) groups of layers as the main path, but have a total less number of layers and/or a total less number of filters than the main path.

Figure 7:
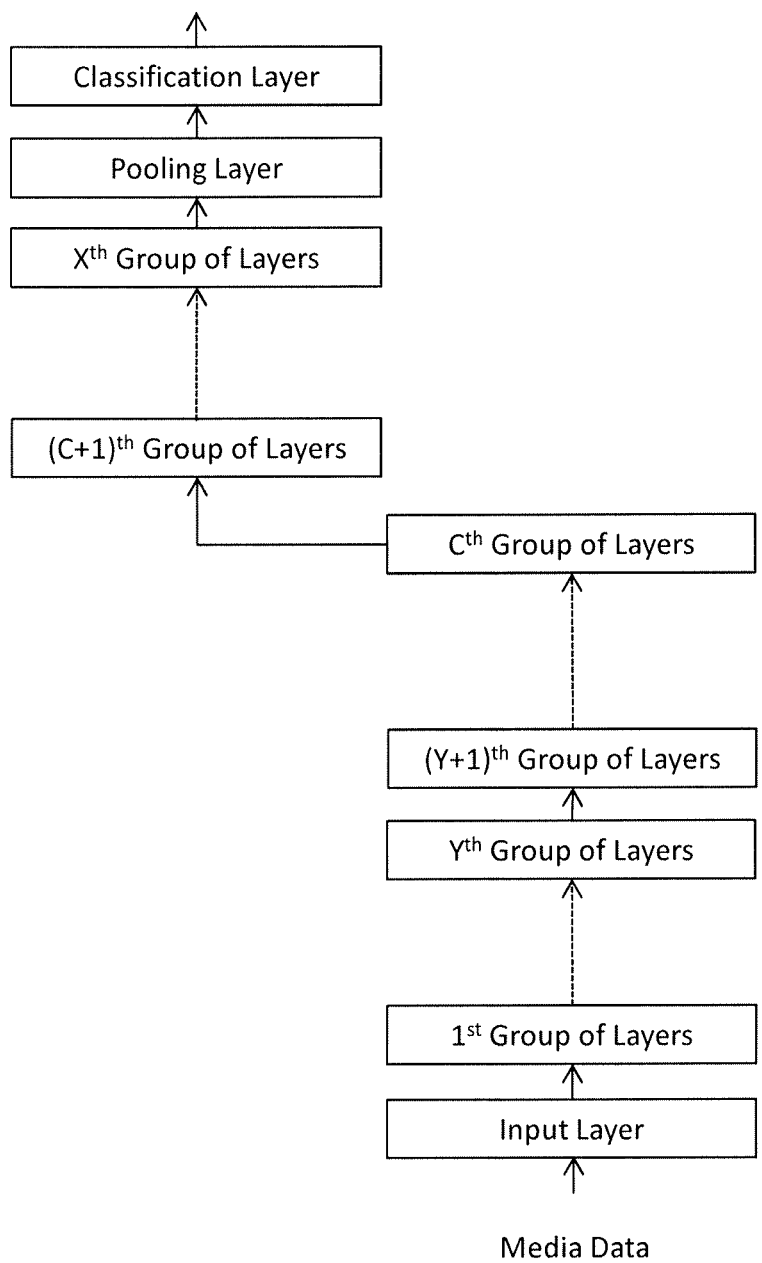
FIG. 7 illustrates another alternative path of the deep neutral network in accordance with an embodiment of the present application.

In addition, there may be some other alternative paths respectively extending from another groups (e.g., the groups prior to the $Y^{th}$ group and after the $Z^{th}$ group of the X groups in the main path) of the X groups in the main path. For example, as shown in FIG. 7, there is another alternative path, which has additional X-C groups of layers (labeled as $(C+1)^{th}$ group, ..., $X^{th}$ group) as a side branch extending from the $C^{th}$ group of the X groups in the main path, and wherein C is an integer and $1 \leq Y < C < Z < X$. Like the other alternative paths, this alternative path also has a "complete but smaller" structure compared to the main path, because this alternative path keeps the same number (i.e., X) groups of layers as the main path, but have a total less number of layers and/or a total less number of filters than the main path.

As mentioned, in the illustrated embodiment, each of the alternative paths has a "complete but smaller" structure compared to the main path, and more particularly, a "complete but smaller" structure at the groups of layers at the side branch. In an embodiment, the total number of the layers of the $N^{th}$ group of layers in the first alternative path is smaller than the total number of the layers of the $N^{th}$ group of layers in the main path, and wherein N>Y and N is an integer of at least one of Y+1, Y+2, ..., X. Similarly, in an embodiment, the total number of the layers of the $N^{th}$ group of layers in the middle (the one between the first alternative path and the last alternative path) alternative path is smaller than a total number of the layers of the $N^{th}$ group of layers in the main path, and wherein N>C and N is an integer of at least one of C+1, C+2, ..., X. Similarly, in an embodiment, the total number of the layers of the $N^{th}$ group of layers in the last alternative path is smaller than the total number of the layers of the $N^{th}$ group of layers in the main path, and wherein N>Z and N is an integer of at least one of Z+1, Z+2, ..., X.

In an embodiment, each layer in each of the main path and the at least one alternative path includes a plurality of filters, and a total number of the filters of the X groups of layers in any of the at least one alternative path is different from a total number of the filters of the X groups of layers in the main path.

In an embodiment, the total number of the filters of the X groups of layers in any of the at least one alternative path is smaller than the total number of the filters of the X groups of layers in the main path.

In an embodiment, the total number of the filters of the $K^{th}$ group of layers in the first alternative path is smaller than the total number of the filters of the $K^{th}$ group of layers in the main path, and wherein K>Y and K is an integer of at least one of Y+1, Y+2, ..., X. Similarly, in an embodiment, the total number of the filters of the $K^{th}$ group of layers in the middle (the one between the first alternative path and the last alternative path) alternative path is smaller than the total number of the filters of the $K^{th}$ group of layers in the main path, and wherein K>C and K is an integer of at least one of C+1, C+2, ..., X. Similarly, in an embodiment, the total number of the filters of the $K^{th}$ group of layers in the last alternative path is smaller than the total number of the filters of the $K^{th}$ group of layers in the main path, and wherein K>Z and K is an integer of at least one of Z+1, Z+2, ..., X.

In an embodiment, each layer in the same group of layers in the main path has a same total number of filters, and each layer in the same group of layers in any of the at least one alternative path has a same total number of filters.

Figure 3:
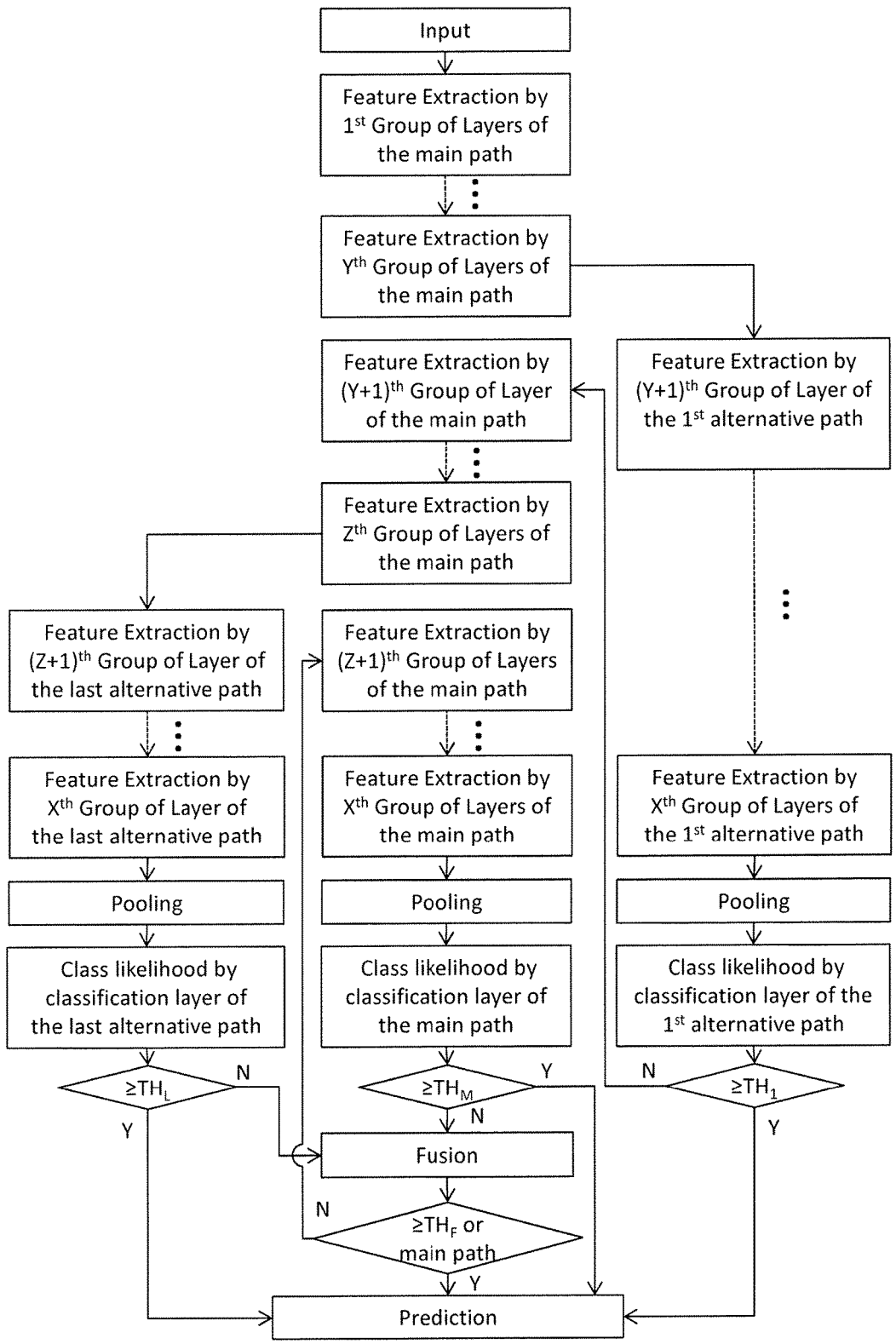
FIG. 3 illustrates how the media data passes through the deep neutral network in accordance with an embodiment of the present application.

FIG. 3 illustrates how the media data passes through the deep neutral network in accordance with an embodiment of the present application. As shown in FIG. 3, the deep neural network directs the media data sequentially through one or more of the at least one alternative path and the main path one at a time until the final class likelihood at the predictor is outputted, and outputs either a highest class likelihood of a first-ever one of the at least one alternative path and the main path that reaches or exceeds a corresponding class likelihood threshold or a highest fused class likelihood from the fusion layer based on the class likelihoods of two or more of any of the main path and the at least one alternative path that the media data has been directed through as the final class likelihood.

Figure 13:
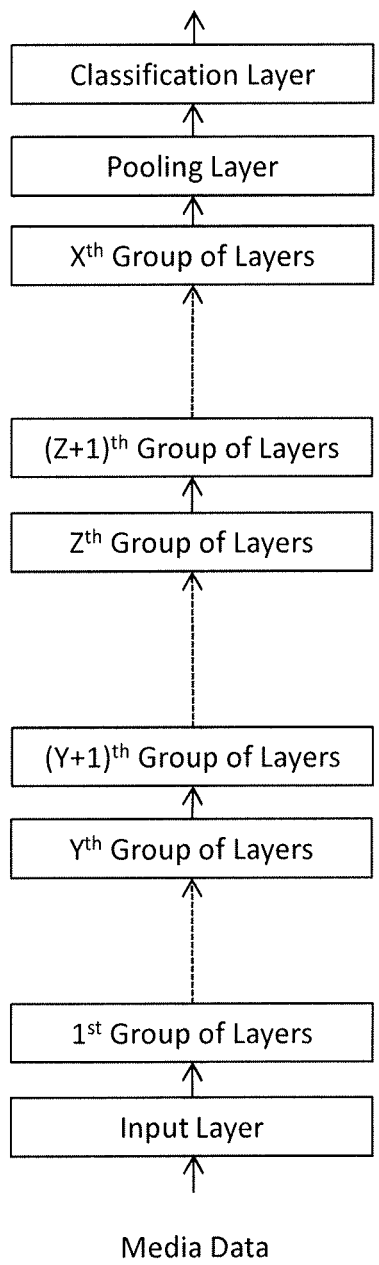
FIG. 13 illustrates the last alternative path of the deep neutral network in accordance with an embodiment of the present application.
Figure 14:
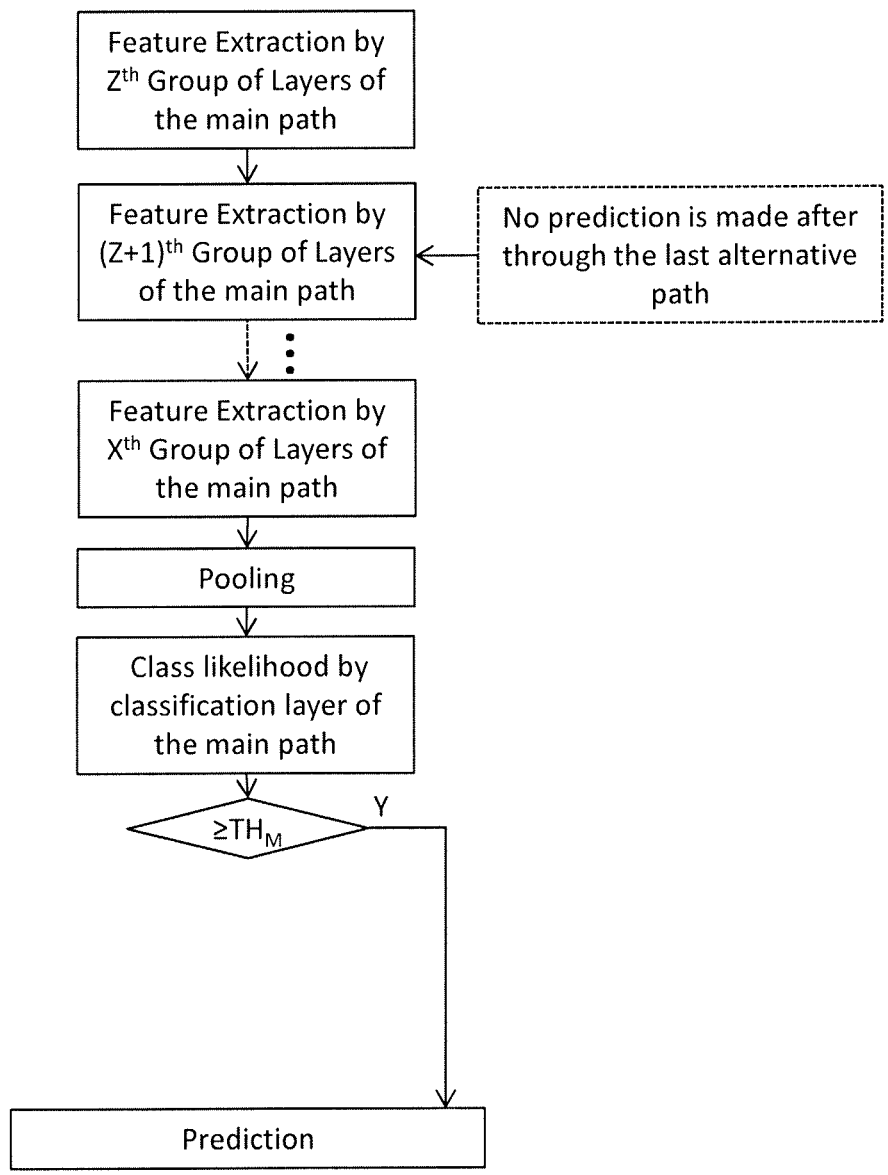
FIG. 14 illustrates how the media data passes through the main path of the deep neutral network in FIG. 10 with a prediction when the fusion is not performed in accordance with an embodiment of the present application.
Figure 15:
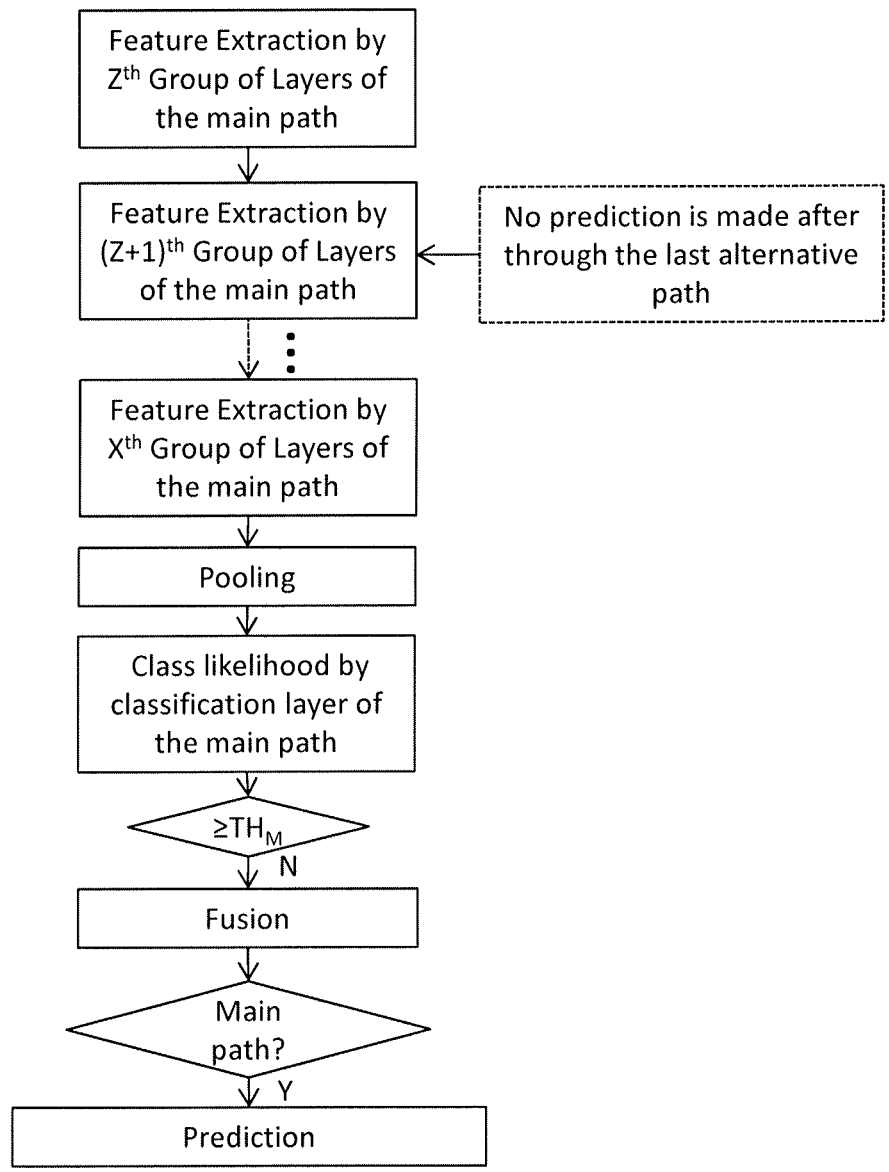
FIG. 15 illustrates how the media data passes through the main path of the deep neutral network in FIG. 10 with a prediction after performing fusion in accordance with an embodiment of the present application.

It should be noted that although FIG. 3 illustrates how the media data passes through more than one alternative path, when there is only one alternative path in the deep neutral network, after the media data passes through the alternative path but the highest class likelihood of the alternative path fails to reach or exceed the corresponding class likelihood threshold, it will be directed back to the main path as shown in FIGS. 13-15.

In an embodiment, the deep neural network does not direct the media data through the main path until the deep neural network has directed the media data sequentially through each of at least one alternative path. As shown in FIG. 3, the deep neural network directs the media data sequentially through one or more alternative paths at a time before through the main path.

In an embodiment, the deep neural network directs the media data sequentially through the plurality of alternative paths in a descending order of a length of the side branch of each of the plurality of alternative paths, and the length of the side branch of each of the plurality of alternative paths is a total number of the additional groups of layers of each of the plurality of alternative paths. As shown in FIG. 3, the first alternative path (i.e., the rightmost path) has the longest side branch because this side branch has the highest number (i.e., X-Y) of groups of layers. On the other hand, another alternative path (i.e., the leftmost path) shown in FIG. 3 has the shortest side branch because this side branch has the lowest number (i.e., X-Z) of groups of layers, wherein 1≤Y<Z<X. Also, as shown in FIG. 7, there is another alternative path, which has a side branch with a number of (X-C) groups of layers, between the shortest side branch and the longest side branch, wherein 1≤Y<C<Z<X. Therefore, in the illustrated embodiments shown in FIGS. 3-15, the deep neural network directs the media data sequentially through the first alternative path (with the side branch of (X-Y) groups of layer, the alternative path with the side branch of (X-C) groups of layer, the last alternative path with the side branch of (X-Z) groups of layer, and then the main path one at a time, until the final class likelihood at the predictor is outputted, which will stop directing the media data through the rest of the alternative paths and the main path (if the media data has not been through the rest of the alternative paths and the main path), as explained below.

Figure 4:
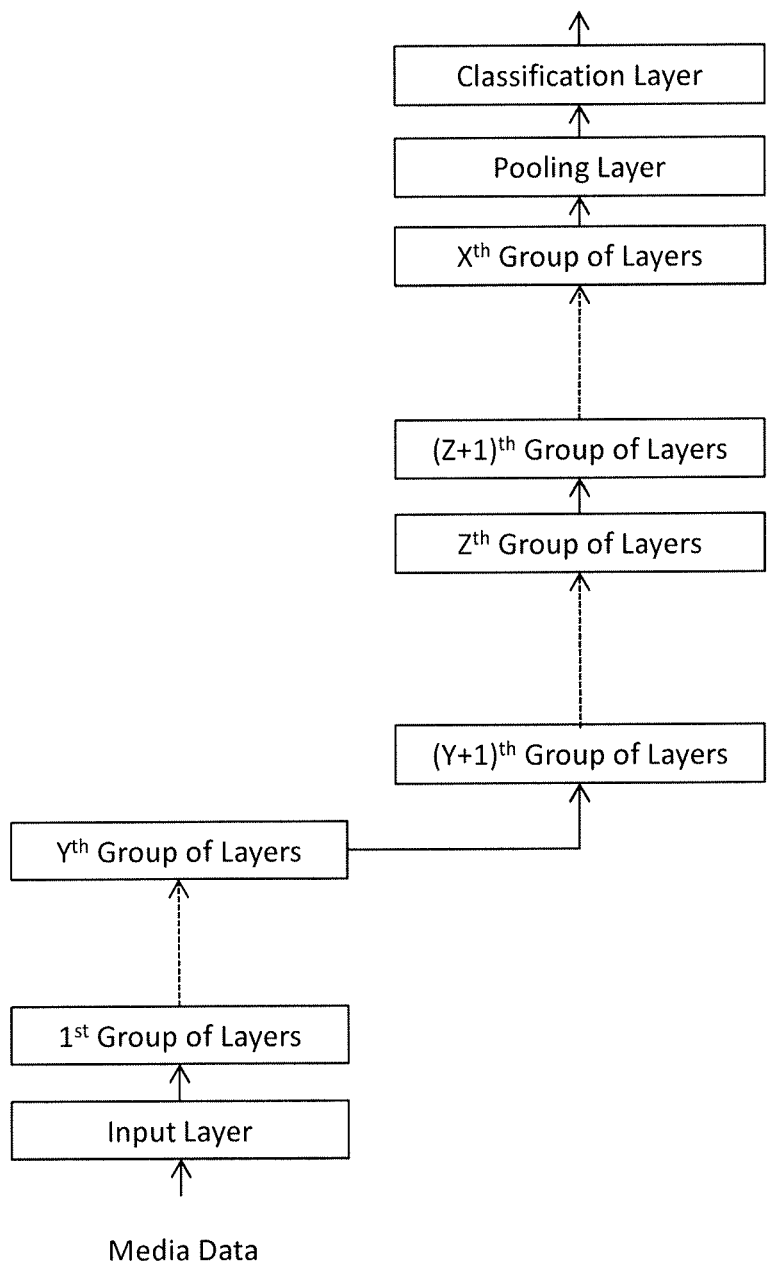
FIG. 4 illustrates the first alternative path of the deep neutral network in accordance with an embodiment of the present application.
Figure 5:
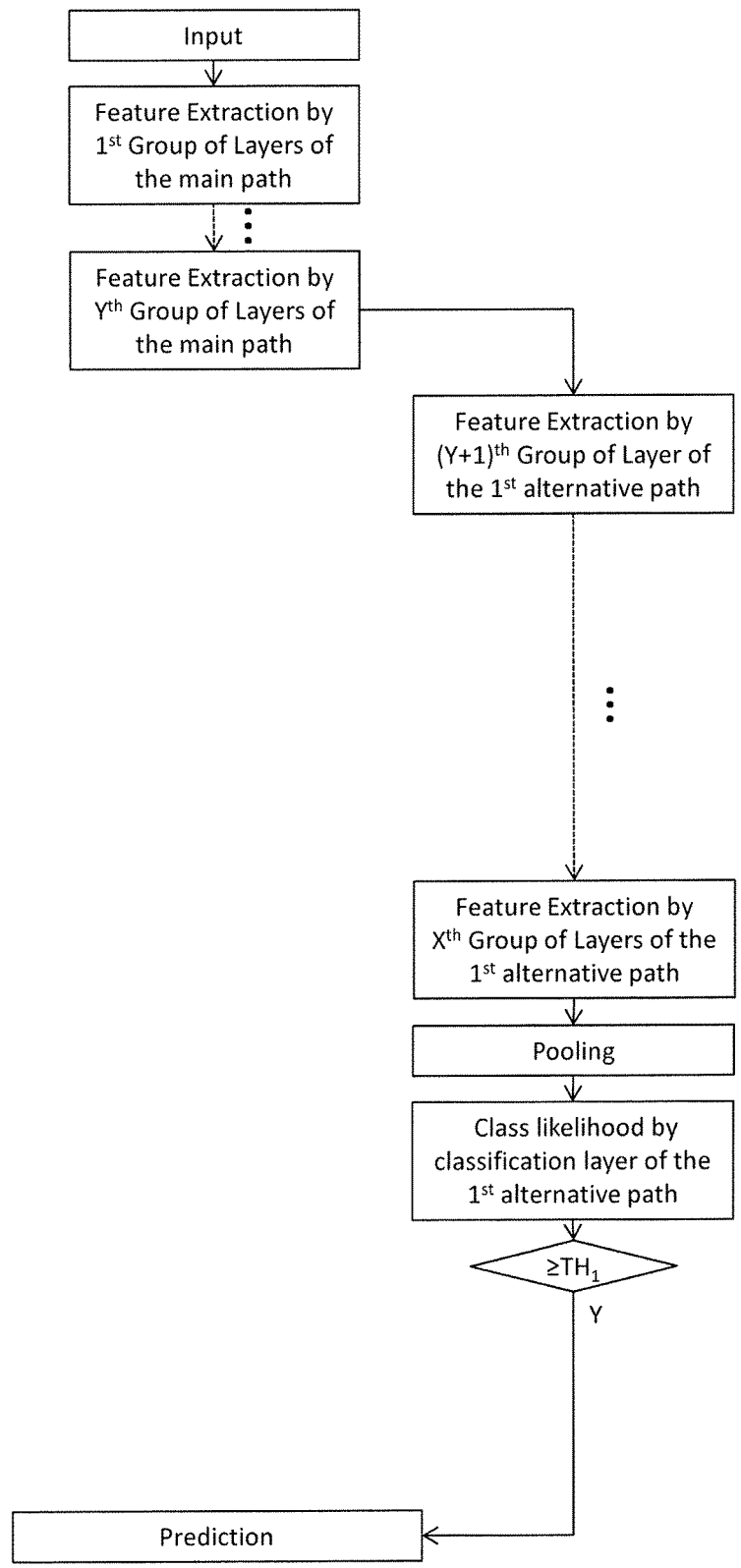
FIG. 5 illustrates how the media data passes through the first alternative path of the deep neutral network in FIG. 4 with a prediction in accordance with an embodiment of the present application.

As shown in FIGS. 4 and 5, the deep neural network directs the media data through the first alternative path, which is in a sequential order of the input layer, the first through the $Y^{th}$ group of layers of the main path, additional (X-Y) groups of layers (i.e., the $(y+1)^{th}$ through the $X^{th}$ group of layers of the first alternative path), the pooling layer and the classification layer, to output (by the classification layer) a class likelihood for each of the plurality of pre-determined data classes for the media data.

In an embodiment, the highest class likelihood (which corresponds to one of the plurality of pre-determined data classes) of all of the class likelihoods for the first alternative path is compared with a class likelihood threshold ($TH_1$) for the first alternative path. If the highest class likelihood for the first alternative path reaches or exceeds the corresponding class likelihood threshold ($TH_1$) for the first alternative path, the highest class likelihood for the first alternative path would be outputted to the predictor as the final class likelihood to make a prediction, i.e., to recognize and classify the media data as the one of the plurality of pre-determined data classes that corresponds to the highest class likelihood.

In an embodiment, when the deep neural network outputs the final class likelihood (which is then sent to the predictor for recognizing and classifying the media data as the one of the plurality of pre-determined data classes that corresponds to the highest class likelihood), the deep neural network stops directing the media data through the rest of the alternative paths and the main path. Therefore, the media data does not have to go through the entire/complete main path, which significantly reduces the computation time (due to the "complete but smaller" structure of the alternative path) and therefore enhances the recognition and classification efficiency.

In an embodiment, the media data is a text data, a graphic data, an image data, an audio data, a video data, or any combination thereof.

In an embodiment, the media data is an image data or a video data showing a portion of a product to be inspected, and the plurality of pre-determined data classes include being defective and being non-defective. For example, the media data is an image data or a video data showing a portion of an electronic device such as a printed circuit board (PCB) to be inspected for any possible defects on the PCB board. When the media data is passed through the deep neural network, the deep neural network will use the final class likelihood outputted from the predictor to recognize and classify the media data into one of the two pre-determined data classes (e.g., defective and non-defective) that corresponds to the final class likelihood to predict whether the PCB at the particular portion has a defect(s).

In an embodiment, the class likelihood is represented in a form of a probability or a class score. For example, in the example of using the deep neural network to determine whether the PCB at the particular portion has a defect(s), the class likelihood may be represented in a form of a probability (e.g., 90%) or a class score (e.g., 90 out of 100). In the above-illustrated embodiment, for example, when the media data passes through the first alternative path and the classification layer of the first alternative path computes the class likelihood for the "defective" class as 90% and computes the class likelihood for the "non-defective" class as 10%, and the class likelihood threshold for the first alternative path is 85%, the highest class likelihood of the two classes (i.e., 90%) will be compared with the class likelihood threshold for the first alternative path (i.e., 85%) to determine if the highest class likelihood will be outputted as the final class likelihood to the predictor. Since the highest class likelihood (i.e., 90%) reaches and exceeds the corresponding class likelihood threshold (i.e., 85%), the highest class likelihood will be outputted as the final class likelihood to the predictor, and the predictor will recognize and classify the media data as the one of the plurality of pre-determined data classes (i.e., the "defective" class) that corresponds to the highest class likelihood, which means that the PCB at the particular portion is recognized to have a defect(s). On the other hand, when the media data passes through the first alternative path and the classification layer of the first alternative path computes the class likelihood for the "defective" class as 5% and computes the class likelihood for the "non-defective" class as 95%, the predictor recognizes and classifies the media data the "non-defective" class corresponding to the final class likelihood, which means that the PCB at the particular portion is recognized to have no defect(s).

In an embodiment, once the deep neural network recognizes and classifies that the PCB at the particular portion has a defect(s), additional deep neural networks may also be applied to the media data to determine the type of the defect(s) and the specific location(s) of the defect(s) at the particular portion of the PCB.

Figure 6:
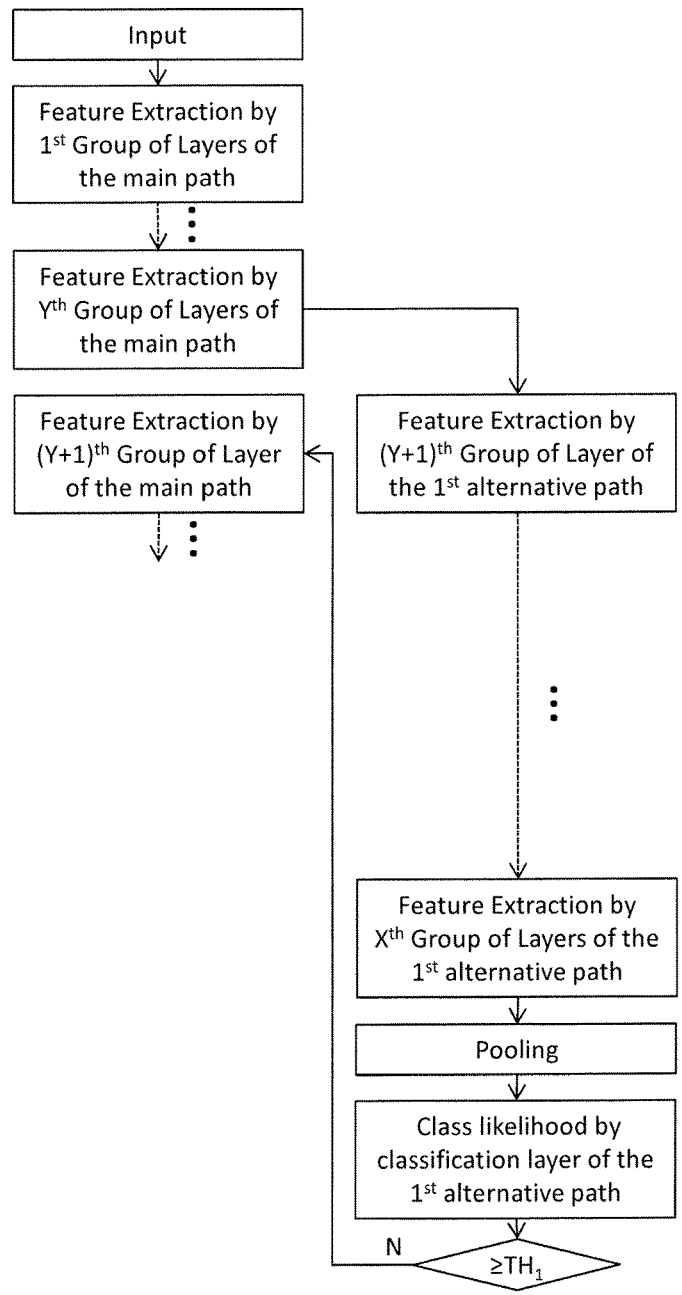
FIG. 6 illustrates how the media data passes through the first alternative path of the deep neutral network in FIG. 4 without a prediction in accordance with an embodiment of the present application.

On the other hand, as shown in FIG. 6, if the highest class likelihood for the first alternative path does not reach or exceed the corresponding class likelihood threshold ($TH_1$) for the first alternative path, no final class likelihood would be outputted to the predictor to make a prediction. Instead, the media data would have to go through the next alternative path (if there is at least one alternative path that the media data has not been through) or the main path (if the media data has been through all of the alternative paths, or if there is only one alternative path).

In an embodiment, if there is at least one alternative path that the media data has not been through, as shown in FIG. 6, the deep neural network directs the media data through the next alternative path by redirecting data outputted from the $Y^{th}$ group of layers of the X groups of layers of the main path into the $(Y+1)^{th}$ group of layers of the X groups of layers of the main path and then through rest of the layers of the next alternative path. In other words, when the media data is through the next alternative path, there is no need to go through the first through the $Y^{th}$ group of layers of the X groups of layers of the main path again, because it has been done during the first alternative path. Therefore, the computation made in the first through the $Y^{th}$ group of layers of the X groups of layers of the main path during the first alternative path does not need to be made again when going through the next alternative path.

In another embodiment, if the first alternative path is the only one alternative path, the deep neural network directs the media data through the main path by redirecting data outputted from the $Y^{th}$ group of layers of the X groups of layers of the main path into the $(Y+1)^{th}$ group of layers of the X groups of layers of the main path and then through rest of the layers of the math path (which would have the same flow as shown in FIGS. 14 and 15, which will be explained below). Similarly, the computation made in the first through the $Y^{th}$ group of layers of the X groups of layers of the main path during the first alternative path does not need to be made again when going through the main path.

Figure 8:
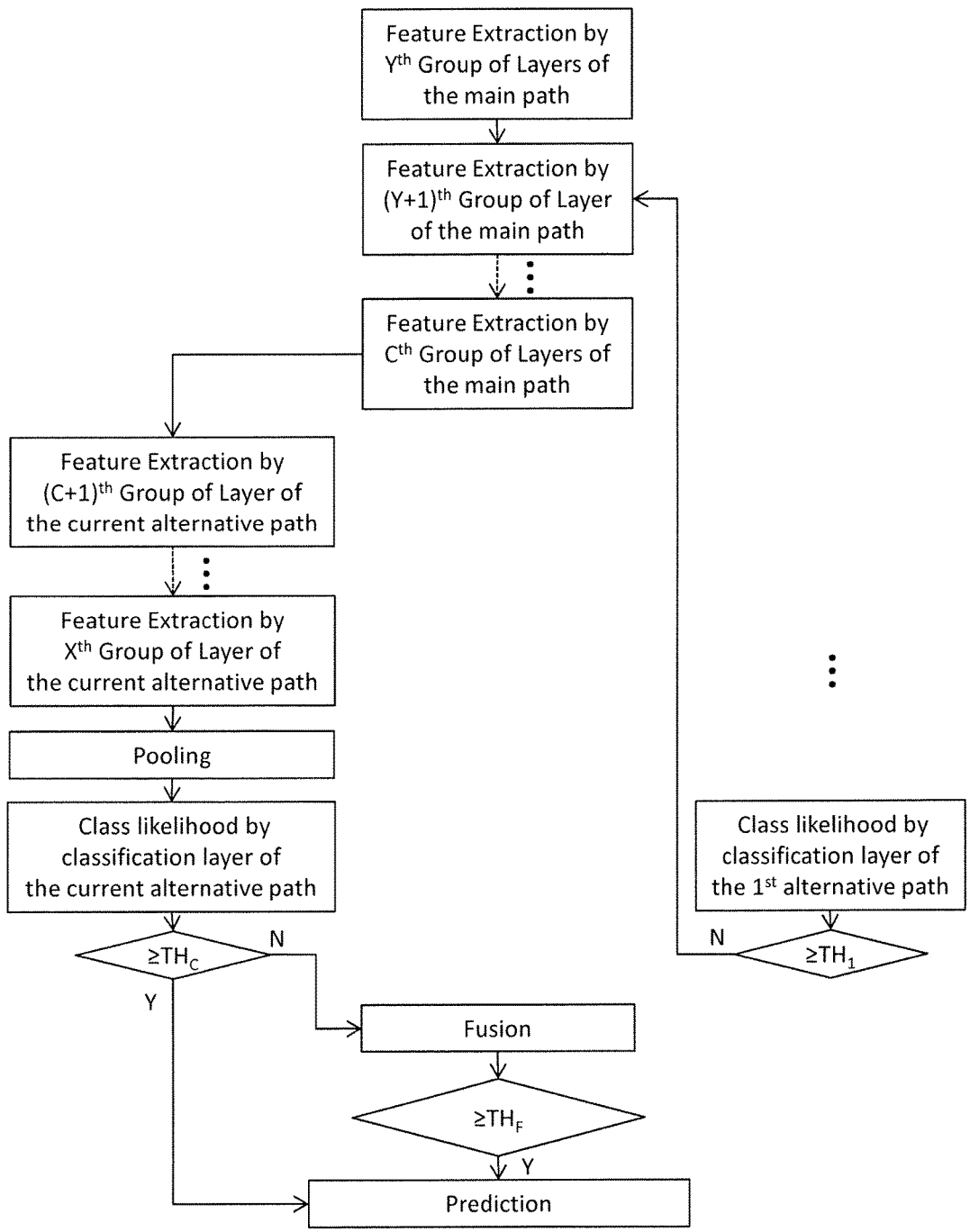
FIG. 8 illustrates how the media data passes through the alternative path of the deep neutral network in FIG. 7 with a prediction in accordance with an embodiment of the present application.

As shown in FIGS. 7 and 8, after the deep neural network redirects data outputted from the $Y^{th}$ group of layers of the X groups of layers of the main path into the $(Y+1)^{th}$ group of layers of the X groups of layers of the main path, the data will go through the rest of the layers of the next alternative path, which is in a sequential order of the $(Y+1)^{th}$ through the $C^{th}$ group of layers of the main path, additional (X-C) groups of layers (i.e., the $(C+1)^{th}$ through the $X^{th}$ group of layers of this alternative path), the pooling layer and the classification layer, to output (by the classification layer) a class likelihood for each of the plurality of pre-determined data classes for the media data.

In an embodiment, the highest class likelihood (which corresponds to one of the plurality of pre-determined data classes) of all of the class likelihoods for this alternative path is compared with a class likelihood threshold ($TH_C$) for this alternative path. If the highest class likelihood for this alternative path reaches or exceeds the corresponding class likelihood threshold ($TH_C$) for this alternative path, the highest class likelihood for this alternative path would be outputted to the predictor as the final class likelihood to make a prediction, i.e., to recognize and classify the media data as the one of the plurality of pre-determined data classes that corresponds to the highest class likelihood.

In an embodiment, the fuse layer computes a current fused class likelihood of the two or more of any of the main path and the at least one alternative path that the media data has been directed through for each of the plurality of pre-determined data classes only when the highest class likelihood of a current one of the at least one alternative path and the main path that the media data has been directed through does not reach or exceed the corresponding class likelihood threshold. For example, as shown in FIG. 8, if the highest class likelihood for this alternative path does not reach or exceed the corresponding class likelihood threshold ($TH_C$) for this alternative path, the fusion layer will compute a current fused class likelihood for each of the plurality of pre-determined data classes based on the class likelihoods of two or more of any alternative paths that the media data has been directed through.

In an embodiment, the two or more of the alternative paths that are used to compute the current fused class likelihood are selected using one (but not limited to) of the following (a) the two or more alternative paths having the highest class likelihoods among all alternative paths that the media data has been directed through;

(b) all alternative paths that the media data has been directed through;

(c) all alternative paths that the media data has been directed through and have the highest class likelihoods that are higher than a predetermined threshold; and (d) the randomly selected two or more alternative paths that the media data has been directed through.

In an embodiment, the fusion layer will compute a current fused class likelihood for each of the plurality of pre-determined data classes based on the class likelihoods of two or more of any alternative paths that the media data has been directed through by one (but not limited to) of the following (a) for each of the plurality of pre-determined data classes, averaging the class likelihoods from the two or more of the alternative paths that the media data has been directed through with a same weight on the class likelihoods from the two or more of the alternative paths that the media data has been directed through;

(b) for each of the plurality of pre-determined data classes, averaging the class likelihoods from the two or more of the alternative paths that the media data has been directed through with respective weights on the class likelihoods from the two or more of the alternative paths that the media data has been directed through;

(c) for each of the plurality of pre-determined data classes, selecting a maximum class likelihood from the class likelihoods from the two or more of the alternative paths that the media data has been directed through;

(d) for each of the plurality of pre-determined data classes, randomly selecting a class likelihood from the class likelihoods from the two or more of the alternative paths that the media data has been directed through; and (e) for each of the plurality of pre-determined data classes, randomly dropping a predetermined number of the class likelihoods from the two or more of the at least one alternative paths that the media data has been directed through, and then performing one of (a)-(d).

In an embodiment, the highest fused class likelihood (which corresponds to one of the plurality of pre-determined data classes) of all of the fused class likelihoods is compared with a corresponding fused class likelihood threshold ($TH_F$). If the highest fused class likelihood reaches or exceeds the corresponding fused class likelihood threshold ($TH_F$), the highest fused class likelihood would be outputted to the predictor as the final class likelihood to make a prediction, i.e., to recognize and classify the media data as the one of the plurality of pre-determined data classes that corresponds to the highest fused class likelihood.

In other words, in the embodiment shown in FIG. 8, the final class likelihood may be outputted to the predictor to recognize and classify the media data if either the highest class likelihood for this alternative path reaches or exceeds the corresponding class likelihood threshold ($TH_C$) for the (non-first) alternative path, or the highest fused class likelihood reaches or exceeds the corresponding fused class likelihood threshold ($TH_F$). It should be noted that since the fused class likelihood is obtained using the class likelihoods of two or more paths, the fused class likelihood can only be obtained when the media data has been directed through at least two paths. Therefore, the fused class likelihood will not be obtained when the media data only passes through the first alternative path.

Figure 9:
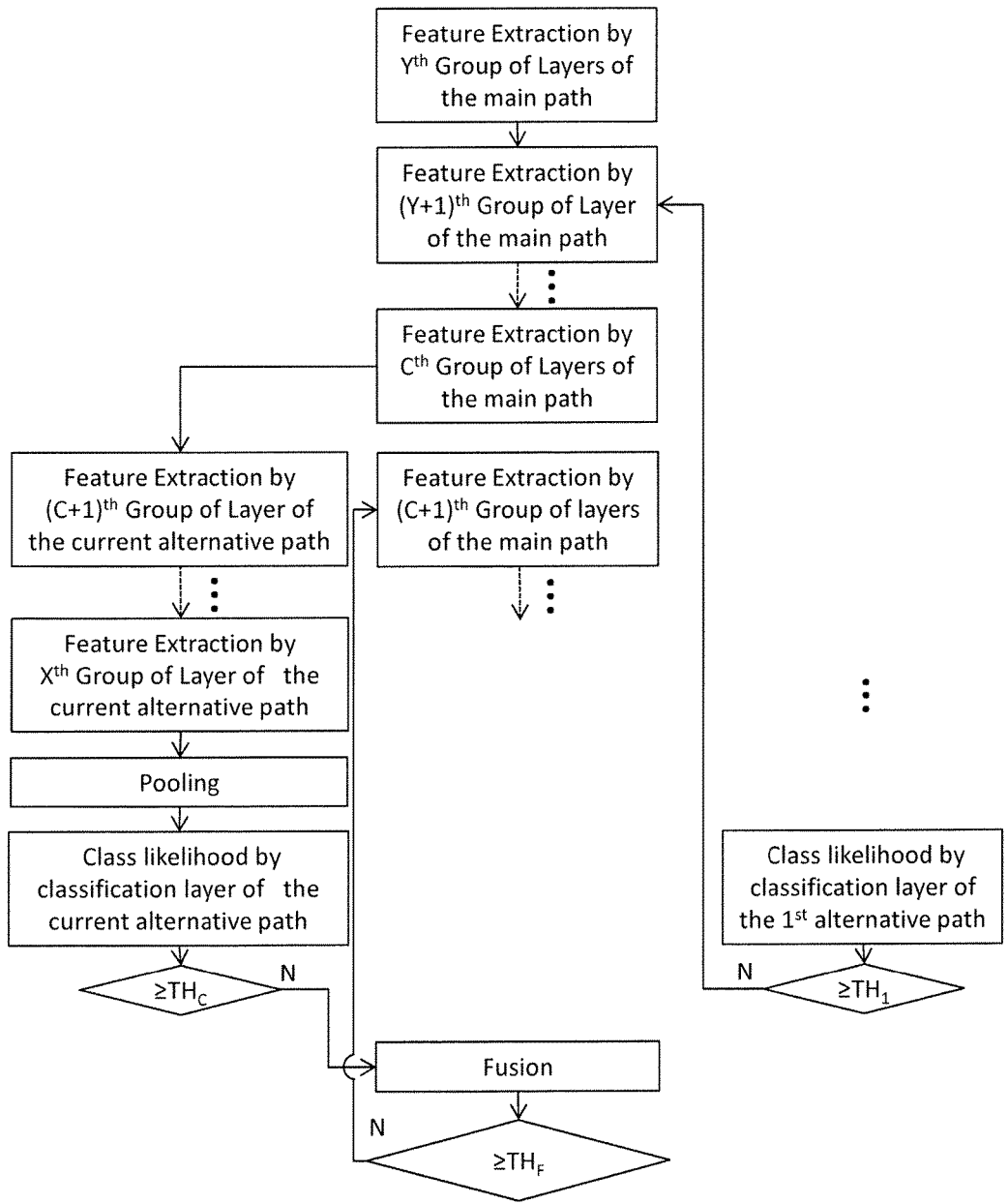
FIG. 9 illustrates how the media data passes through the alternative path of the deep neutral network in FIG. 7 without a prediction after performing fusion in accordance with an embodiment of the present application.

On the other hand, as shown in FIG. 9, if neither the highest class likelihood for this alternative path reaches or exceeds the corresponding class likelihood threshold ($TH_C$) for the (non-first) alternative path, nor the highest fused class likelihood reaches or exceeds the corresponding fused class likelihood threshold ($TH_F$), no final class likelihood would be outputted to the predictor to make a prediction. Instead, the media data would have to go through the next alternative path (if there is at least one alternative path that the media data has not been through) or the main path (if the media data has been through all of the alternative paths).

Figure 8A:
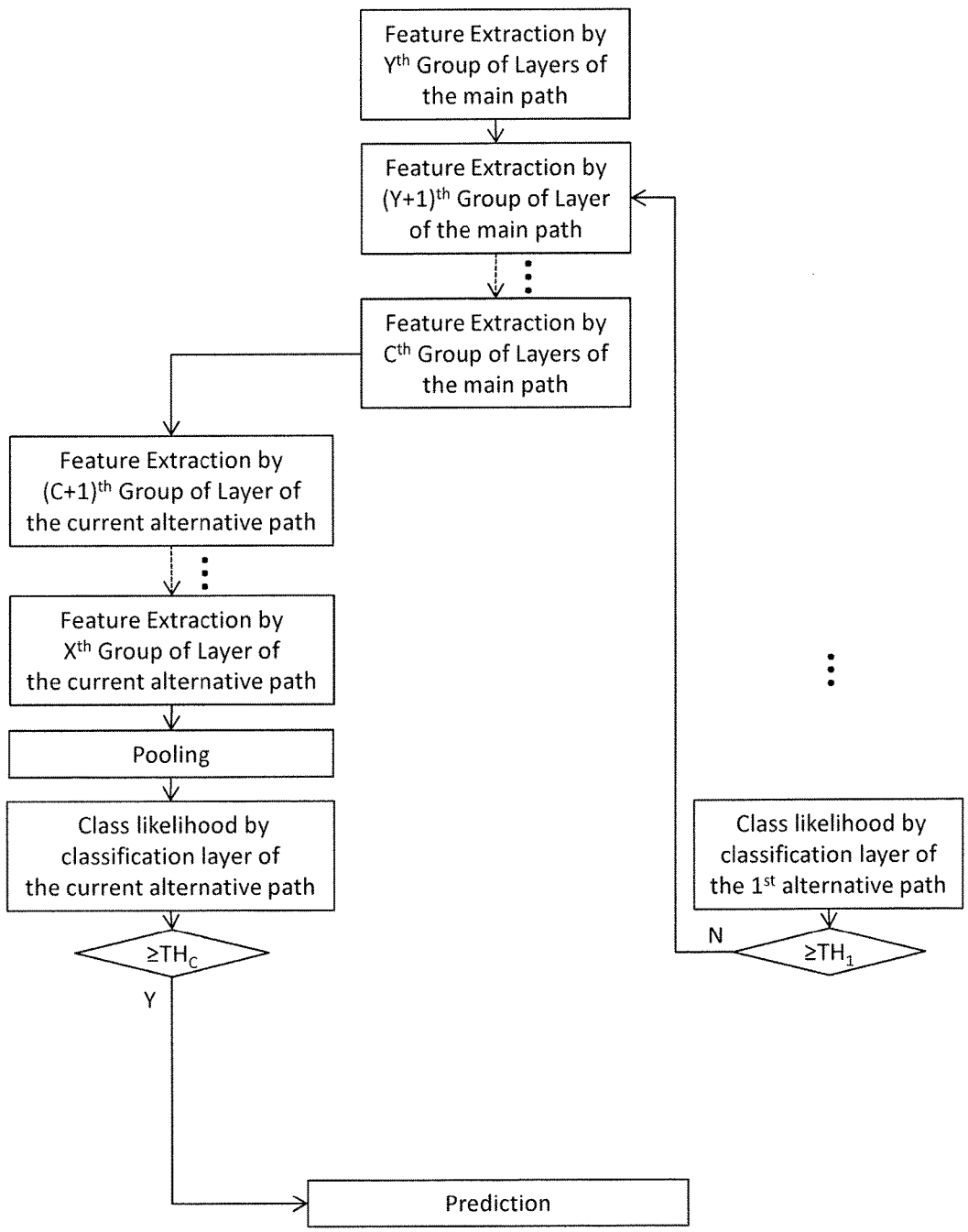
FIG. 8A illustrates how the media data passes through the alternative path of the deep neutral network in FIG. 7 with a prediction when the fusion is not performed in accordance with another embodiment of the present application.
Figure 9A:
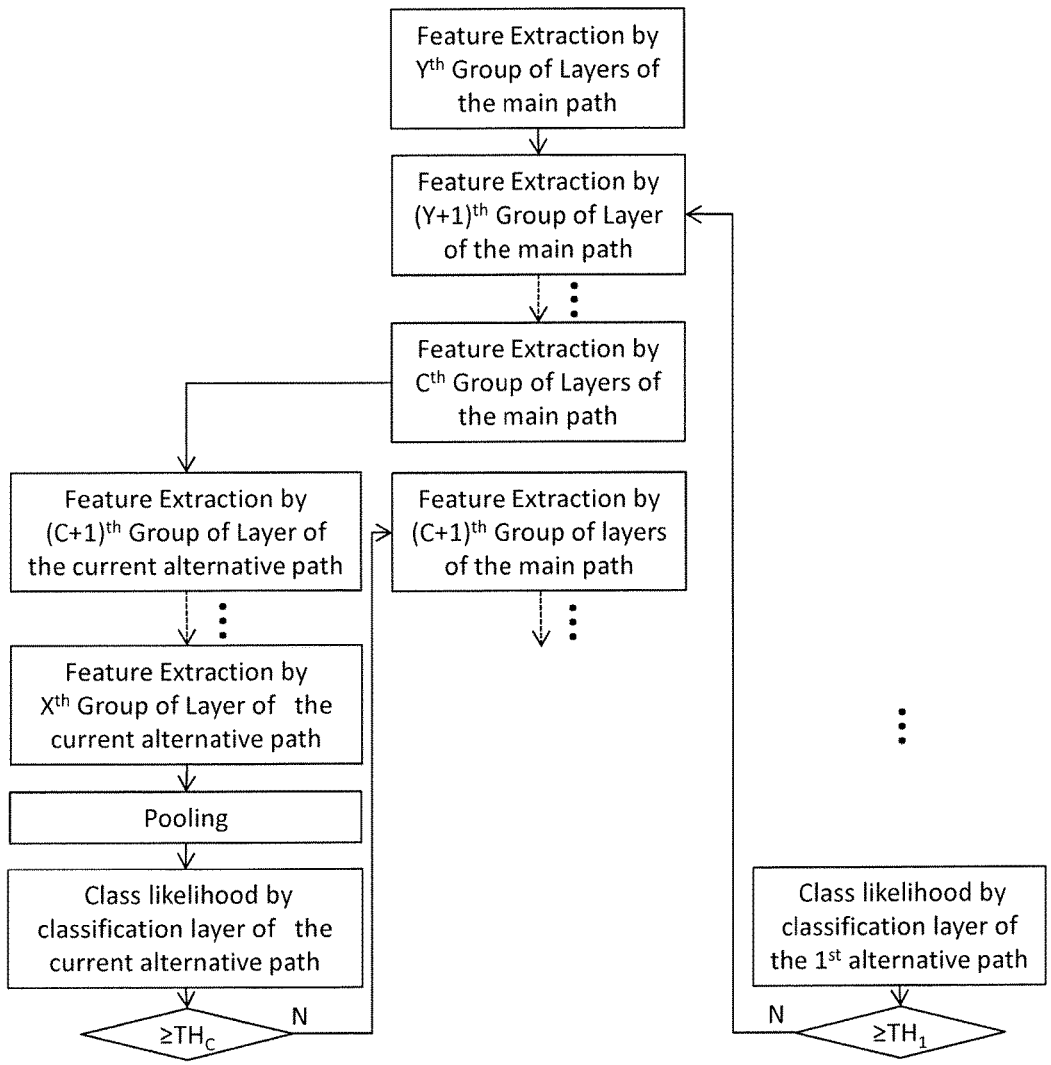
FIG. 9A illustrates how the media data passes through the alternative path of the deep neutral network in FIG. 7 without a prediction when the fusion is not performed in accordance with another embodiment of the present application

In another embodiment, as shown in FIGS. 8A and 9A, the final class likelihood may be outputted to the predictor to recognize and classify the media data if the highest class likelihood for this alternative path reaches or exceeds the corresponding class likelihood threshold ($TH_C$) for the (non-first) alternative path. If the highest class likelihood for this alternative path does not reach or exceed the corresponding class likelihood threshold ($TH_C$) for this alternative path, no fusions of the class likelihoods from two or more alternative paths will be performed, and no final class likelihood would be outputted to the predictor to make a prediction. Instead, the media data would have to go through the next alternative path (if there is at least one alternative path that the media data has not been through) or the main path (if the media data has been through all of the alternative paths).

Figure 10:
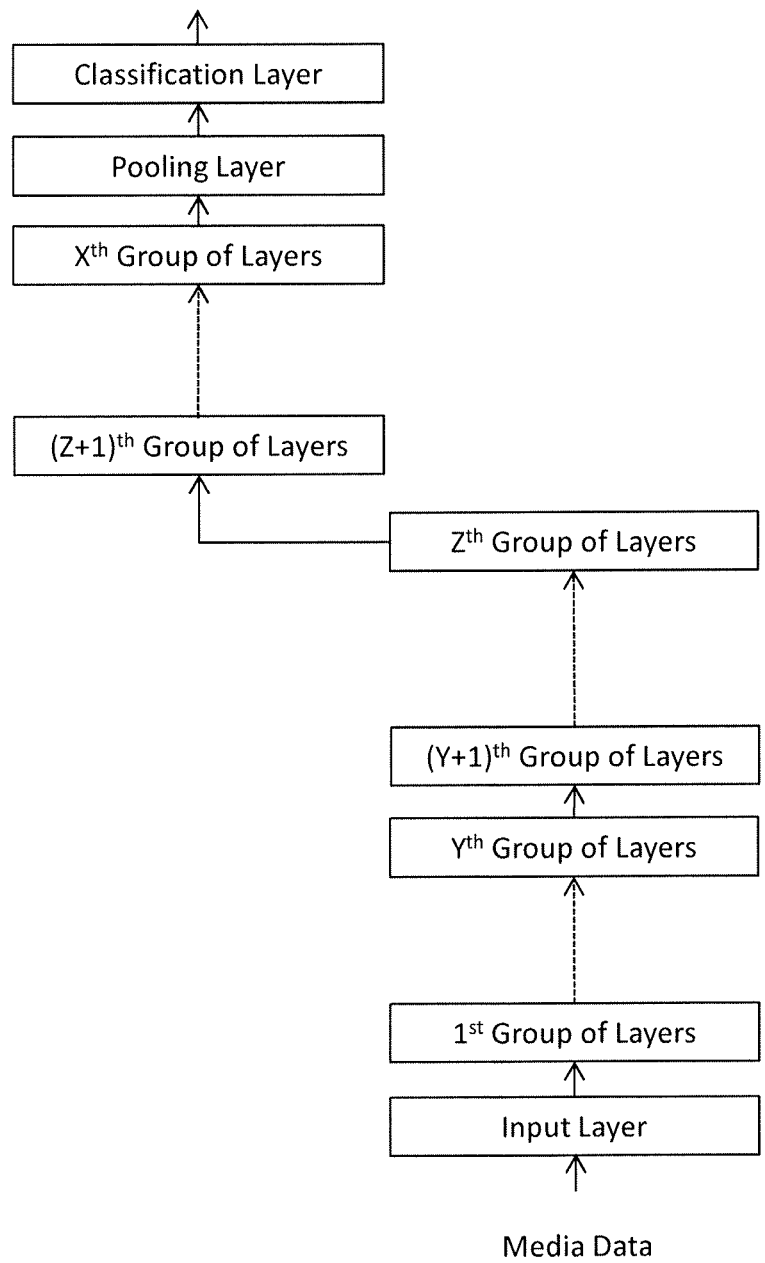
FIG. 10 illustrates the last alternative path of the deep neutral network in accordance with an embodiment of the present application.
Figure 11:
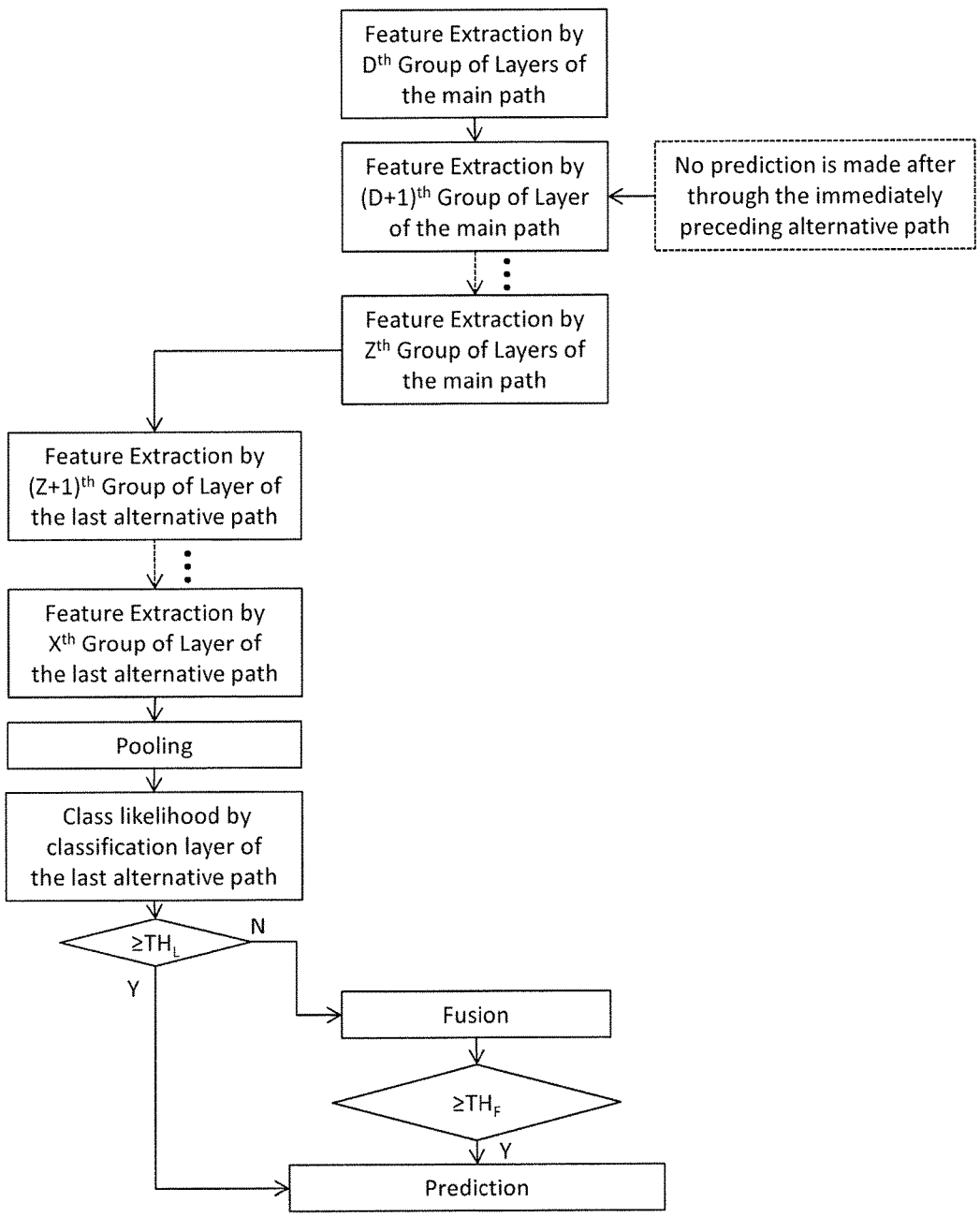
FIG. 11 illustrates how the media data passes through the last alternative path of the deep neutral network in FIG. 10 with a prediction in accordance with an embodiment of the present application.
Figure 12:
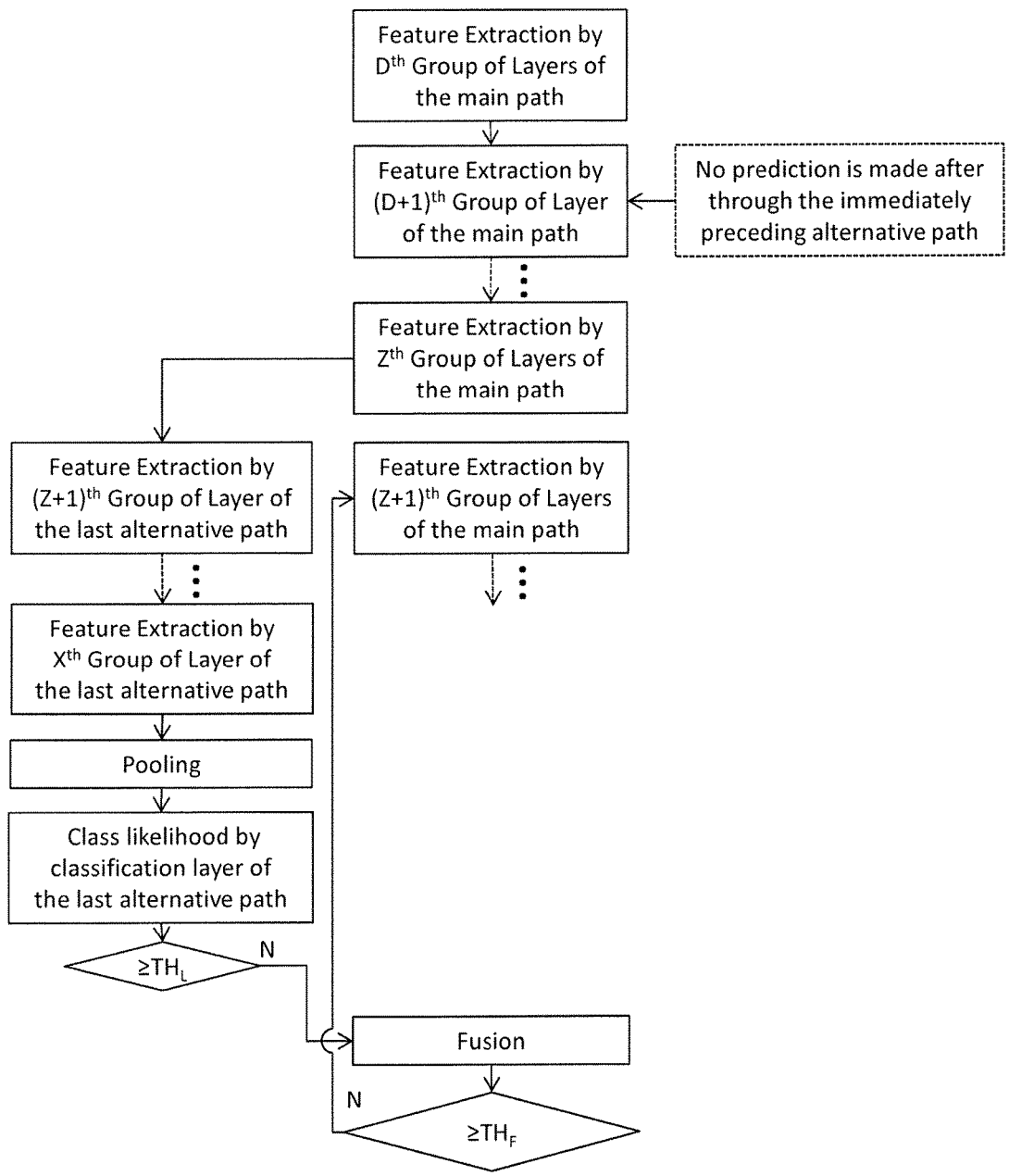
FIG. 12 illustrates how the media data passes through the last alternative path of the deep neutral network in FIG. 10 without a prediction after performing fusion in accordance with an embodiment of the present application.

FIGS. 11 and 12 show that no final class likelihood is outputted when the media data passes through the previous alternative paths and the previous fusion processes (if any), and the deep neural network directs the media data through the last alternative path as shown in FIG. 10. The process shown in FIGS. 11 and 12 are substantially the same as what is shown in FIGS. 8 and 9, except that the last alternative path has a side branch extending from the $Z^{th}$ group of the X groups in the main path, wherein D is an integer and $1 \leq Y < D < Z < X$.

In addition, in the embodiment shown in FIGS. 11 and 12, the fuse layer will computes a new fused class likelihood of two or more of any of the main path and the at least one alternative path has been directed through for each of the plurality of pre-determined data classes only when the highest class likelihood of the last alternative path does not reach or exceed the corresponding class likelihood threshold ($TH_L$). The two or more of the alternative paths that are used to compute the current fused class likelihood are selected using one (but not limited to) of the above-mentioned manners, and the fusion layer will compute a current fused class likelihood for each of the plurality of pre-determined data classes based on the class likelihoods of two or more of any alternative paths that the media data has been directed through by one (but not limited to) of the above-mentioned manners. It should be noted that the manners to select the two or more of the alternative paths to compute the current fused class likelihood during different alternative paths can be the same or different from each other, and the manners of computing the fused class likelihood during different alternative paths can be the same or different from each other, and the fused class likelihood threshold for different alternative paths can be the same or different from each other.

Figure 11A:
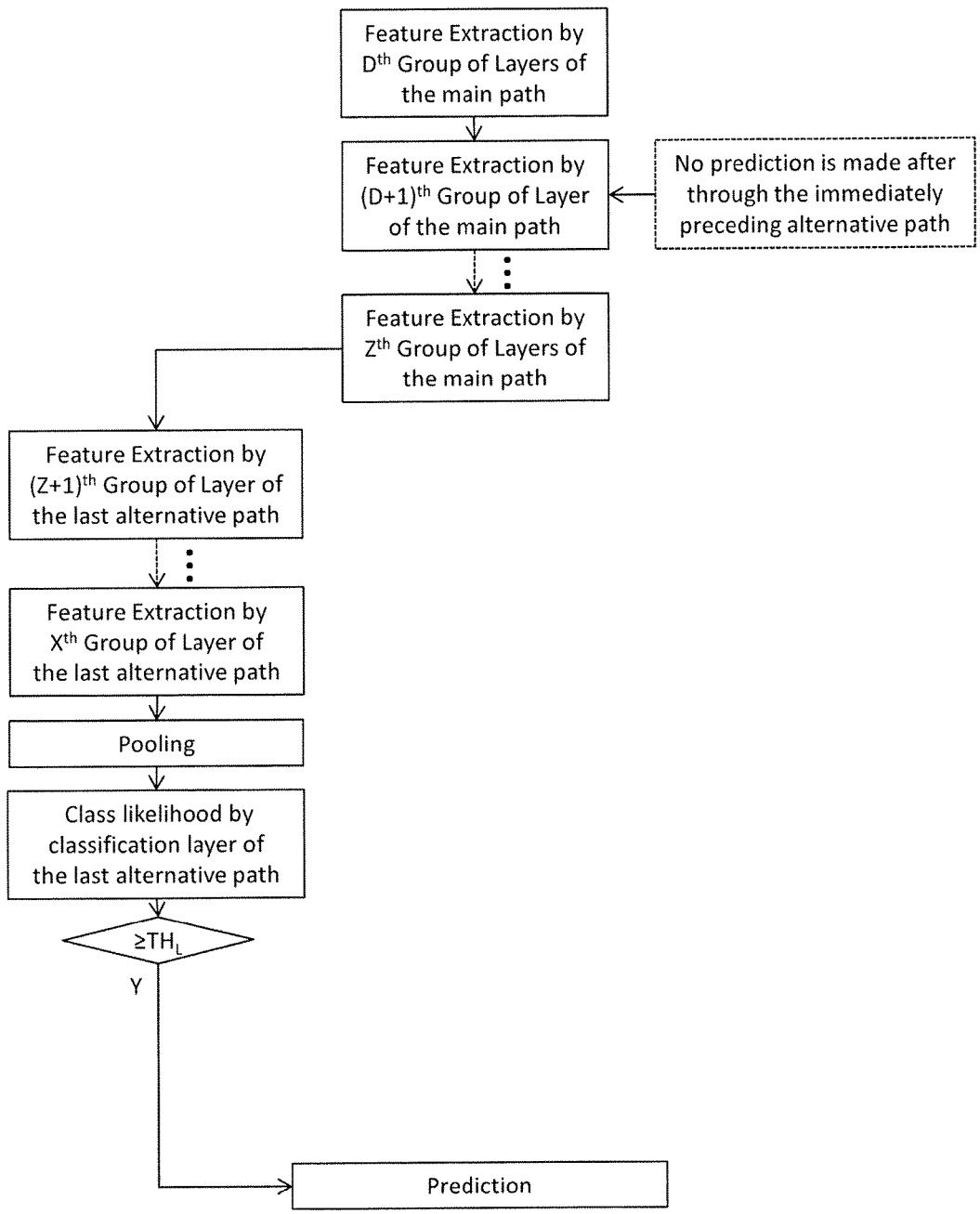
FIG. 11A illustrates how the media data passes through the last alternative path of the deep neutral network in FIG. 10 with a prediction when the fusion is not performed in accordance with another embodiment of the present application.
Figure 12A:
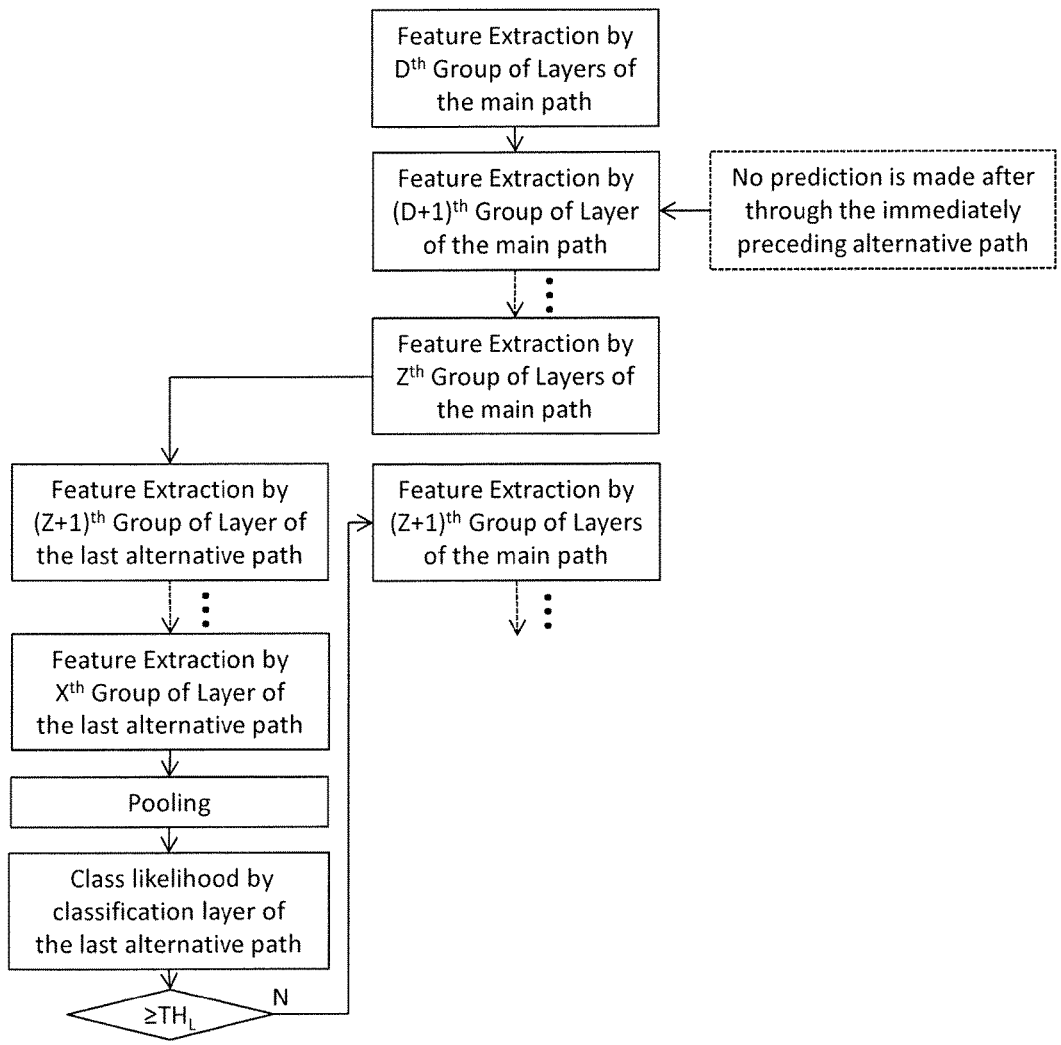
FIG. 12A illustrates how the media data passes through the last alternative path of the deep neutral network in FIG. 10 with a prediction when the fusion is not performed in accordance with another embodiment of the present application.

Similarly, FIGS. 11A and 12A show a process similar to what is shown in FIGS. 11 and 12, except that the fusion is not performed in FIGS. 11A and 12A. In addition, the process shown in FIGS. 11A and 12A are substantially the same as what is shown in FIGS. 8A and 9A, except that the last alternative path has a side branch extending from the $Z^{th}$ group of the X groups in the main path, and wherein D is an integer and $1 \leq Y < D < Z < X$.

In an embodiment, the deep neural network does not direct the media data through the main path until the deep neural network has directed the media data sequentially through each of at least one alternative path. For example, as shown in FIGS. 13 and 14, if no final class likelihood is outputted after the media data passes through all alternative paths, the media data would have to go through the main path. In addition, when the deep neural network only has one alternative path (see the embodiment mentioned above), if no final class likelihood is outputted after the media data passes through the only alternative path, the media data would have to go through the main path.

As shown in FIG. 14, the deep neural network directs the media data through the main path by redirecting data outputted from the $Z^{th}$ group of layers of the X groups of layers of the main path into the $(Z+1)^{th}$ group of layers of the X groups of layers of the main path and then through rest of the layers of the main path. In other words, when the media data is through the main path, there is no need to go through the first through the $Z^{th}$ group of layers of the X groups of layers of the main path again, because it has been done during the alternative paths. Therefore, the computation made in the first through the $Z^{th}$ group of layers of the X groups of layers of the main path during the alternative paths does not need to be made again when going through the main path.

As shown in FIG. 14, after the deep neural network redirects data outputted from the $Z^{th}$ group of layers of the X groups of layers of the main path into the $(Z+1)^{th}$ group of layers of the X groups of layers of the main path, the data will go through the rest of the layers of the main path, which is in a sequential order of the $(Z+1)^{th}$ through the $X^{th}$ group of layers of the main path, the pooling layer and the classification layer, to output (by the classification layer) a class likelihood for each of the plurality of pre-determined data classes for the media data.

In an embodiment, the highest class likelihood (which corresponds to one of the plurality of pre-determined data classes) of all of the class likelihoods for the main path is compared with a class likelihood threshold ($TH_M$) for this alternative path. If the highest class likelihood for the main path reaches or exceeds the corresponding class likelihood threshold ($TH_M$) for the main path, the highest class likelihood for the main path would be outputted to the predictor as the final class likelihood to make a prediction, i.e., to recognize and classify the media data as the one of the plurality of pre-determined data classes that corresponds to the highest class likelihood.

In an embodiment, the fuse layer computes a current fused class likelihood of the two or more of any of the main path and the at least one alternative path that the media data has been directed through for each of the plurality of pre-determined data classes only when the highest class likelihood of the main path that the media data has been directed through does not reach or exceed the corresponding class likelihood threshold. For example, as shown in FIG. 15, if the highest class likelihood for the main path does not reach or exceed the corresponding class likelihood threshold ($TH_M$) for the main path, the fusion layer will compute a current fused class likelihood for each of the plurality of pre-determined data classes based on the class likelihoods of two or more of any of the main path and the alternative paths that the media data has been directed through.

In an embodiment, the two or more of the main path and the alternative paths that are used to compute the current fused class likelihood are selected using one (but not limited to) of the following (a) the two or more of any of the main path and the alternative paths having the highest class likelihoods among all alternative paths that the media data has been directed through;

(b) all paths (including the main path and the alternative paths) that the media data has been directed through;

(c) all paths (including the main path and the alternative paths) that the media data has been directed through and have the highest class likelihoods that are higher than a predetermined threshold; and (d) the randomly selected two or more of any of the main path and the alternative paths that the media data has been directed through.

In an embodiment, the fusion layer will compute a current fused class likelihood for each of the plurality of pre-determined data classes based on the class likelihoods of two or more of any of the main path and the alternative paths that the media data has been directed through by one (but not limited to) of the following (a) for each of the plurality of pre-determined data classes, averaging the class likelihoods from the two or more of any of the main path and the alternative paths that the media data has been directed through with a same weight on the class likelihoods from the two or more of the alternative paths that the media data has been directed through;

(b) for each of the plurality of pre-determined data classes, averaging the class likelihoods from the two or more of any of the main path and the alternative paths that the media data has been directed through with respective weights on the class likelihoods from the two or more of any of the main path and the alternative paths that the media data has been directed through;

(c) for each of the plurality of pre-determined data classes, selecting a maximum class likelihood from the class likelihoods from the two or more of any of the main path and the alternative paths that the media data has been directed through;

(d) for each of the plurality of pre-determined data classes, randomly selecting a class likelihood from the class likelihoods from the two or more of any of the main path and the alternative paths that the media data has been directed through; and (e) for each of the plurality of pre-determined data classes, randomly dropping a predetermined number of the class likelihoods from the two or more of any of the main path and the alternative paths that the media data has been directed through, and then performing one of (a)-(d).

In an embodiment, unlike the alternative paths, the highest fused class likelihood (which corresponds to one of the plurality of pre-determined data classes) of all of the fused class likelihoods will be outputted as the final class likelihood to make a prediction, i.e., to recognize and classify the media data as the one of the plurality of pre-determined data classes that corresponds to the highest fused class likelihood (i.e., no need to compare with a corresponding fused class likelihood threshold), because there are no other paths for the media data to go through.

Figure 16:
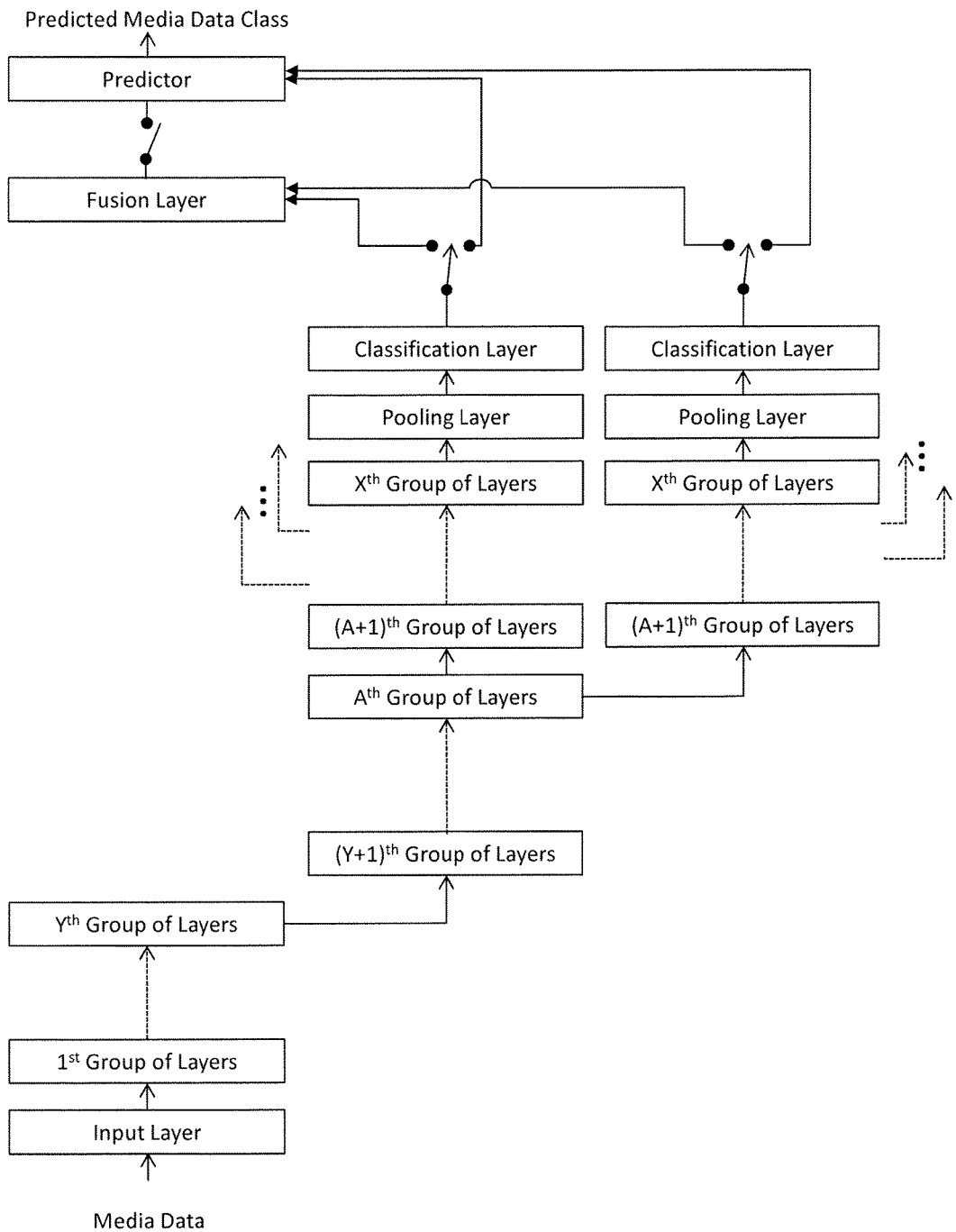
FIG. 16 illustrates a deep neutral network in accordance with another embodiment of the present application.

FIG. 16 illustrates a deep neutral network in accordance with another embodiment of the present application. The deep neutral network shown in FIG. 16 is similar to the deep neutral network shown in FIG. 1 except some of the side branches may have sub-side branches extending therefrom. For illustration purposes, FIG. 16 only shows the rightmost alternative path in FIG. 1 without showing the details of the main path and the other alternative paths that are shown in FIG. 1.

As shown in FIGS. 1 and 16, both deep neutral networks have an alternative path in a sequential order of the input layer, only X groups of layers, a pooling layer, and a classification layer, wherein the X groups of layers in the rightmost alternative path consist of the first Y groups of the X groups of layers in the main path, and additional (X-Y) groups of layers (labeled as $(Y+1)^{th}$ group, . . . , $X^{th}$ group) as a side branch extending from the $Y^{th}$ group of the X groups in the main path. However, as shown in FIG. 16, the deep neutral networks further includes at least one sub-side branch extending from the $W^{th}$ group of the additional X-Y groups of the side branch (i.e., the $A^{th}$ group (counted from the $1^{st}$ group of the main path) of this alternative path in FIG. 16, and Y+W=A). Therefore, another alternative path is formed in a sequential order of the input layer, only X groups of layers, a pooling layer, and a classification layer, wherein the X groups of layers in this alternative path consist of the first Y groups of the X groups of layers in the main path, and the $(Y+1)^{th}$ group of layers through the $A^{th}$ group of layers, and additional X-A (i.e., X-Y-W) group of layers (labeled as $(A+1)^{th}$ group, . . . , $X^{th}$ group) as a sub-side branch extending from the $W^{th}$ group of layers of the side branch (i.e., the $A^{th}$ group (counted from the $1^{st}$ group of the main path) of this alternative path in FIG. 16), wherein A is an integer and $1 \leq Y < A < X$, and W is an integer and $1 \leq W < X-Y$. In other words, this alternative path (with the sub-side branch), like the main path and the other alternative paths of the deep neutral network, also has the same number (i.e., X) of groups of layers.

In an embodiment, this sub-side branch has a total less number of layers and/or a total less number of filters than the side branch from which the sub-side branch extends. Therefore, this alternative path with the sub-side branch has a "complete but smaller" structure compared to the alternative path with the side branch, because this alternative path with the sub-side branch keeps the same number (i.e., X) groups of layers as the alternative path with the side branch, but has a total less number of layers and/or a total less number of filters than the alternative path with the side branch.

Figure 17:
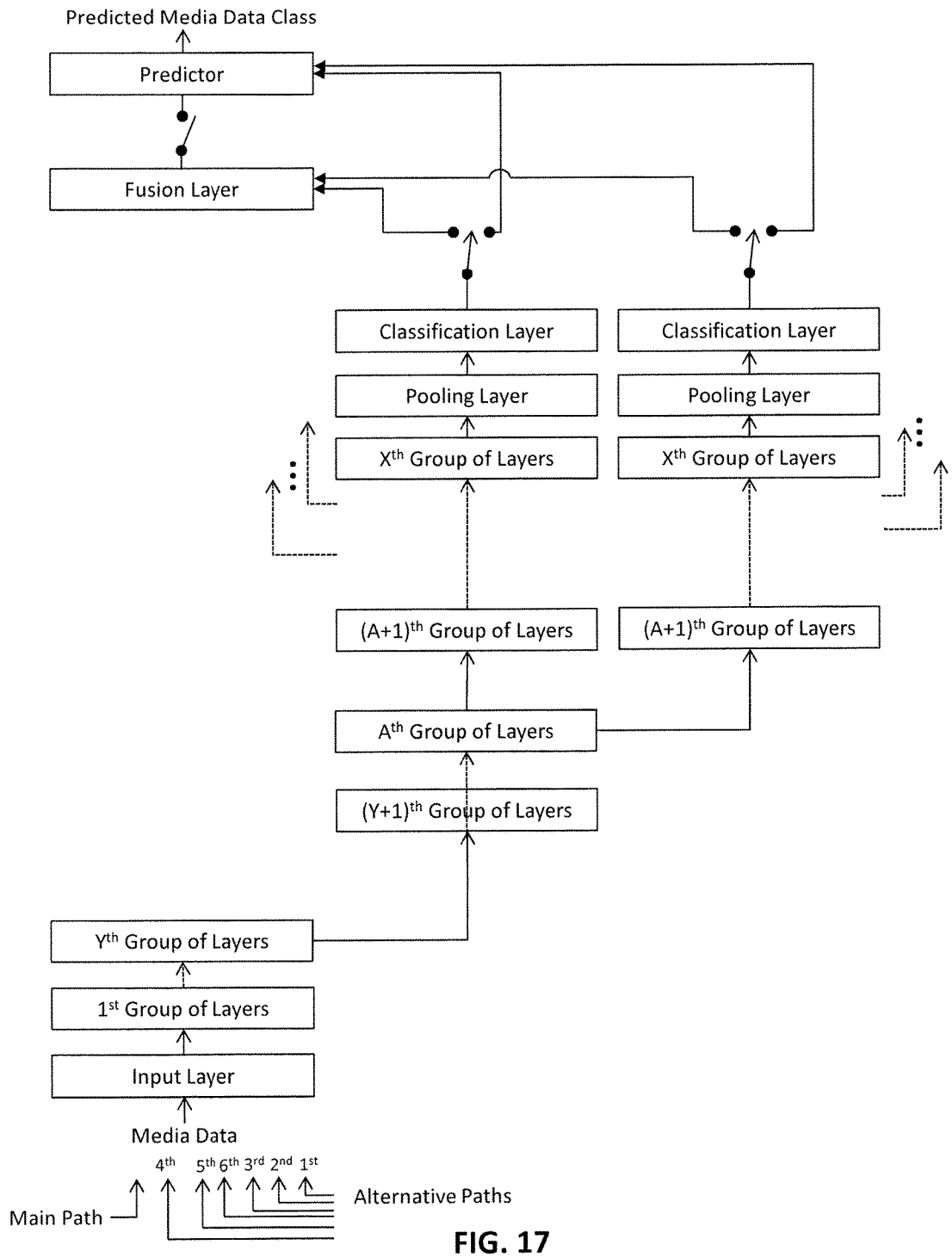
FIG. 17 illustrates the main path and some of the alternative paths of the deep neutral network as shown in FIG. 16.

Similarly, the deep neutral network may have more than one sub-side branch extending from the side branch shown in FIG. 16, and may have one or more sub-side branches extending from other side branch(es). In addition, the deep neutral network may also have one or more sub-sub-side branches extending from any sub-side branches, and so on. FIG. 17 illustrates the main path and some of the alternative paths of the deep neutral network as shown in FIG. 16, which include some alternative paths with sub-side branches and some alternative paths with sub-sub-side branches. It should be noted that each of the alternative paths keeps the same number (i.e., X) groups of layers, but has a total less number of layers and/or a total less number of filters than the (either the main or alterative) path from which this particular alternative path extends, so as to have a "complete but smaller" structure compared to the (either the main or alterative) path from which this particular alternative path extends.

In addition, same as the embodiment shown in FIGS. 1-15, in the embodiment shown in FIGS. 16 and 17, when the media data enter into the deep neutral network, the deep neutral network will direct the media data sequentially through one or more of the alternative paths and the main path one at a time until the final class likelihood at the predictor is outputted, and outputs either a highest class likelihood of a first-ever one of the alternative paths and the main path that reaches or exceeds a corresponding class likelihood threshold or a highest fused class likelihood from the fusion layer based on the class likelihoods of two or more of any of the main path and the alternative paths that the media data has been directed through as the final class likelihood.

Furthermore, the class likelihood for each of the plurality of pre-determined data classes for the media data through each alternative path, the fused class likelihood based on the class likelihoods of two or more of any of the main path and the at least one alternative path, and the final class likelihood in the embodiment shown in FIGS. 16 and 17 are calculated in the same manner as illustrated in the embodiments shown in FIGS. 1-15, and therefore will not be explained here. Also, same as the embodiments shown in FIGS. 1-15, in the embodiment shown in FIGS. 16 and 17, since the fused class likelihood is obtained using the class likelihoods of two or more paths (either two or more alternative paths, or the main path and one or more alternative path), the fused class likelihood can only be obtained when the media data has been directed through at least two paths. Therefore, the fused class likelihood will not be obtained when the media data only passes through the $1^{st}$ alternative path.

In an embodiment, the deep neural network will direct the media data sequentially through the plurality of alternative paths in a descending order of a length of the side branch of each of the plurality of alternative paths, and the length of the side branch of each of the plurality of alternative paths is a total number of the additional X-Y groups of layers of each of the plurality of alternative paths. If there is/are sub-side branches extending from the side branch, the deep neural network will direct the media data sequentially through the alternative paths with sub-side branches in a descending order of a length of the sub-side branch of each of the alternative paths with sub-side branches. In other words, if there is/are sub-side branches extending from the side branch, the side branch is viewed as a main branch of the sub-side branch, and the sub-side branch(es) is/are viewed as the side branch(es) of the side branch when the deep neural network directs the media data sequentially through these alternative paths, and the deep neural network does not direct the media data through the alternative path with the particular side branch until the deep neural network has directed the media data sequentially through each of the alternative paths with sub-side branches of the particular side branch. The same principle applies to alternative paths with different levels of side branches (e.g., side branch, sub-side branch, sub-sub-side branch, sub-sub-sub-side branch, and so on). In addition, the deep neural network does not direct the media data through an alternative path with a shorter side branch until the deep neural network has directed the media data sequentially through each of the alternative paths within an alternative path with a longer side branch. Furthermore, the deep neural network does not direct the media data through the main path until the deep neural network has directed the media data sequentially through each of alternative paths with side branches. Also, when the deep neural network outputs the final class likelihood when the media data passes through the first-ever one of the alternative paths, the deep neural network stops directing the media data through rest of the at least one alternative path and the main path.

For example, as shown in FIGS. 16 and 17, the deep neural network will direct the media data through the $1^{st}$ alternative path, because the 1st path has the longest side branch, the longest sub-side branch within the longest side branch, and the longest sub-sub-side branch within the longest sub-side branch within the longest side branch. If the deep neural network does not output the final class likelihood when the media data passes through the 1st alternative path, the deep neural network will direct the media data through the 2nd alternative path, because the 2nd alternative path has the longest side branch, the longest sub-side branch within the longest side branch, and the 2nd longest sub-sub-side branch within the longest sub-side branch within the longest side branch. If the deep neural network does not output the final class likelihood when the media data passes through the 2nd alternative path, the deep neural network will direct the media data through the 3rd alternative path (which is viewed as a main branch of the sub-sub side branches), because the 3rd alternative path has the longest side branch, the longest sub-side branch within the longest side branch, and no sub-sub-side branch within the longest sub-side branch within the longest side branch.

If the deep neural network does not output the final class likelihood when the media data passes through the 3rd alternative path, the deep neural network will direct the media data through the 4th alternative path, because the 4th alternative path has the longest side branch and the 2nd longest sub-side branch within the longest side branch. If the deep neural network does not output the final class likelihood when the media data passes through the 4th alternative path, the deep neural network will direct the media data through the 5th alternative path, because the 5th alternative path has the longest side branch and the 3rd longest sub-side branch within the longest side branch. If the deep neural network does not output the final class likelihood when the media data passes through the 5th alternative path, the deep neural network will direct the media data through the 6th alternative path (which is viewed as a main branch of the sub side branches), because the 6th alternative path has the longest side branch and no sub-side branch within the longest side branch. This process will go on until the deep neural network outputs the final class likelihood (either when the media data passes through the first-ever one of the alternative paths, or when the media data passes through the main path after passing through all of the alternative paths).

In addition, same as the embodiments shown in FIGS. 1-15, in the embodiment shown in FIGS. 16 and 17, if the deep neural network does not output the final class likelihood when the media data passes an alternative path, and there is at least one alternative path that the media data has not been through, the deep neural network will direct the media data through the next alternative path by redirecting data outputted from the particular group of layers of the main branch (or side branch, sub-side branch . . . ), from which the side branch (or sub-side branch, sub-sub-side branch . . . ) extends, into the next group of layers of the main branch (or side branch, sub-side branch . . . ) and then through the rest of the layers of the next alternative path. In other words, when the media data is through the next alternative path, there is no need to go through any previous groups of layers of the main branch (and/or side branch, sub-side branch . . . ) again, because the computation has already been made to these groups of layers during previous alternative path(s).

Figure 18:
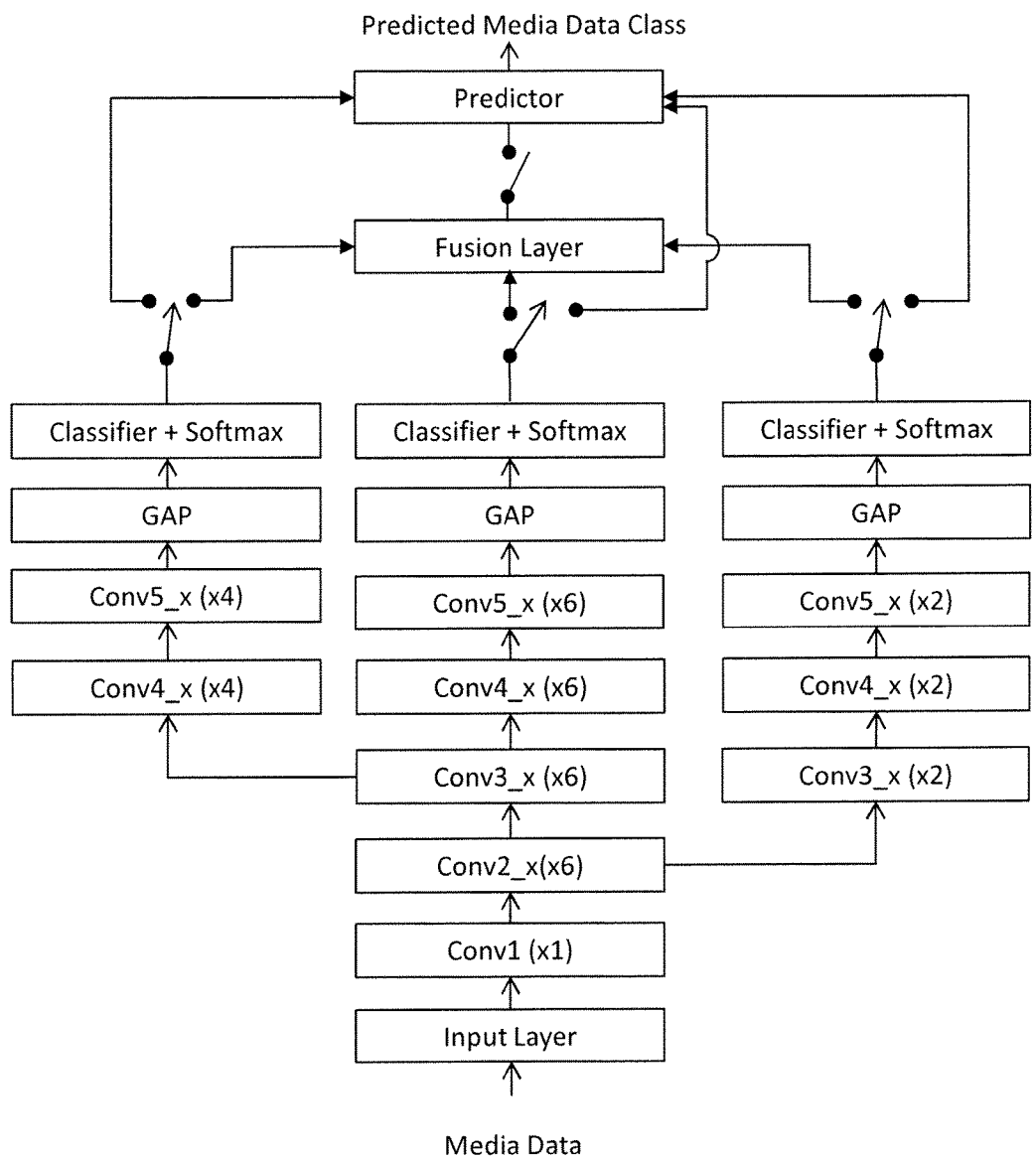
FIG. 18 illustrates a convolutional neural network with the main path and the alternative paths in accordance with an embodiment of the present application.

In an embodiment, the deep neural network is a convolutional neural network. FIG. 18 illustrates a convolutional neural network with the main path and the alternative paths in accordance with an embodiment of the present application. Evaluation of gains brought by this convolutional neural network (hereinafter the DFB-Net) is also illustrated.

In particular, the main branch (the baseline model) consists of five convolutional groups followed by a global average pooling (GAP) layer and ends with a classification layer with softmax, as shown in FIG. 18. The building blocks are composed of wide ResNet structures, not bottleneck designs. The total number of weighted layers is equal to 8×N+2. As shown in FIG. 18, the structure of N=6, k=6 is adopted to result in a baseline CNN with 50 layers, denoted by WRN-50-N6-k6.

While adding side branches to form a complete DFB-Net, the side branches are complete but smaller than the main branch. "Smaller" implies that side branches are equipped with fewer number of layers and/or smaller filter size for faster forward inference. "Complete" means that a branchy sub-network still has a complete form analogous to the main branch.

In particular, as shown in FIG. 18, there are one main path (in a sequential order of the input layer, five (5) convolutional groups: Conv1, Conv2_x (x6), Conv3_x (x6), Conv4_x (x6) and Conv5_x (x6), the global average pooling layer, the classification layer (the classifier+Softmax)), the first alternative path (in a sequential order of the input layer, five (5) convolutional groups: Conv1, Conv2_x (x6), Conv3_x (x2), Conv4_x (x2), Conv5_x (x2), the global average pooling layer, the classification layer (the classifier+Softmax)), and the second alternative path (in a sequential order of the input layer, five (5) convolutional groups: Conv1, Conv2_x (x6), Conv3_x (x6), Conv4_x (x4), Conv5_x (x4), the global average pooling layer, the classification layer (the classifier+Softmax)).

In addition, the output size and the block types of the filters for the respective convolutional groups Conv1, Conv2_x (x6), Conv3_x (x6), Conv4_x (x6) and Conv5_x, and the global average pooling layer are shown in Table 1 as follows:

TABLE 1

| Group Name | Output Size | Block Type | |
|---|---|---|---|
| Conv1 | 56 × 56 | [3 × 3, 16] | |
| Conv2—x | 56 × 56 | [3 × 3, 16 × k; 3 × 3, 16 × k] | × N |
| Conv3—x | 28 × 28 | [3 × 3, 32 × k; 3 × 3, 32 × k] | × N |
| Conv4—x | 14 × 14 | [3 × 3, 64 × k; 3 × 3, 64 × k] | × N |
| Conv5—x | 7 × 7 | [3 × 3, 128 × k; 3 × 3, 128 × k] | × N |
| Global-Ave-Pool | 1 × 1 | [7 × 7] | |

Here, N is a number of blocks in a convolutional group, and k is a widening factor to increase the filter size. In this embodiment, N for the main path is set 6, and k for the main path is set 6, N for the side branch of the first (i.e., the rightmost) alternative path is set 2, and k for the side branch of the first alternative path is set 2, and N for the side branch of the second (i.e., the leftmost) alternative path is set 4, and k for the side branch of the first alternative path is set 4.

As illustrated in FIG. 18, the five (5) convolutional groups: Conv1, Conv2_x (x6), Conv3_x (x6), Conv4_x (x6) and Conv5 x (x6) in the main path has a total of 49 layers, the five (5) convolutional groups: Conv1, Conv2_x (x6), Conv3_x (x2), Conv4_x (x2) and Conv5_x (x2) in the first alternative path a total of 25 layers, and the five (5) convolutional groups: Conv1, Conv2_x (x6), Conv3_x (x6), Conv4_x (x4) and Conv5_x (x4) in the second alternative path a total of 41 layers. Therefore, the first and second alternative paths have less layers than the main path. In addition, since a smaller k is set for the side branch of each of the first and the second alternative paths than for the main path, the number of filters of each of the first and the second alternative paths is smaller than the number of filters of the main path. However, the first and the second alternative paths still keep the same number (i.e., five (5)) of convolutional groups as the main path. Therefore, each of the first alternative path and the second alternative path has a "complete but smaller" structure compared to the main path.

Network Training

For brevity all exit points of the illustrated convolutional neural network (hereinafter the DFB-Net) are numbered starting from 1, . . . , M, where M is for the exit point of the main branch, and 1 is for the exit point of the earliest side branch, and so on. Since there are more than one exit points in the DFB-Net, training is done by solving a joint optimization problem on a weighted sum of loss $L_s(W_s)$ associated with each exit point, where s=1, . . . , M, and $W_s$ denotes the sets of parameters contained in the specified complete path respectively.

Given a training example x, each complete path is treated as a feature extractor $f(\cdot)$, and then the output z of a complete path just before the softmax layer is given by $$z = f(x; W_s).$$

Suppose that the number of all possible labels is K, the predicted probability $y_c$, c=1, K, for label c produced by the softmax layer can be presented as follows:

$$y_c = \frac{\exp(z_c)}{\sum_{k=1}^{K} \exp(z_k)},$$

and it is defined that $$y = \{y_c\}_{c=1}^{K} = \text{softmax}(z).$$

Therefore, the loss function $L_s(W_s)$ for a complete path can be presented as follows $$L_s(W_s) = -\sum_{k=1}^{K} t_k \ln y_k,$$

where $t_k$ denotes the corresponding ground truth label for sample x and uses the 1-of-K coding scheme. The combined loss function for the whole DFB-Net could be expressed by $$L_{total} = \sum_{s=1}^{M} \alpha_s L_s(W_s),$$

where $\alpha_s$ is a loss weight associated with each branchy loss function $L_s(W_s)$.

Forward Inference

To perform forward inference on an already-trained DFB-Net, the procedures are formulated in the Algorithm below. Firstly, for each exit point s, it is necessary to assign an exit threshold $p_s \in [0, 1]$ as a confidence measure. Given a test image x, its softmax probability y generated by an exit point s is used for early-exit decision: if max{y}>$p_s$, then return argmax{y} as the predicted label from this exit point and stop further computation; otherwise, continue the forward evaluations in following layers of the next branch. If max{y}≤$p_s$, for all s, then a probability fusion is made by averaging softmax outputs of all exit points to obtain the average $\bar{y}$ and then return argmax{$\bar{y}$} as the predicted label.

---

Algorithm 1: DFB-Net Forward Inference

Input: A test image x, exit thresholds {$p_s$}
Output: The predicted label of test image x
1  procedure DFB-Net(x, {$p_s$})
2      Initialize $\bar{y}$ = 0
3      for s = 1,..., M do
4         z = f(x; $W_s$)
5         y = softmax(z)
6         if max{y} > $p_s$ then
7            return argmax{y}
8         else
9            $\bar{y}$ = $\bar{y}$ + y
10     $\bar{y}$ = $\bar{y}$ / M
11     return argmax{$\bar{y}$}

---

Experiments

During network training, exit thresholds are replaced by loss weights to form a weighted sum of losses as an output of the fusion unit. The SGD with momentum and weight decay are used to train the baseline model (i.e., the convolutional neural network with only main path and no side branches) from scratch. Once trained, we initialize the main branch of the DFB-Net with the weights of the already-trained baseline model. For side branches, their weights are initialized by the method, and then we train the whole DFB-Net. For baseline model training, the learning rate starts from 0.1 and is dropped by 0.2 every 60 epochs, and the models are trained for total 300 epochs. The weight decay is set to 0.0001, momentum is set to 0.9, and mini-batch size is set to 50.

The DFB-Net is evaluated on CIFAR-10 and CIFAR-100, and the results are compared with state-of-the-art methods. The two CIFAR datasets consist of 32×32 color images drawn from 10 and 100 classes respectively, and each contains 50,000 images for train set and 10,000 images for test set. Scale and aspect ratio data augmentation is applied by randomly choosing two values h, w∈ [48, 64] and then an image is resized to h×w. Then, a 48×48 crop is randomly sampled from the resized image or its horizontal flip, with the per-pixel mean subtracted.

At test time, an image is resized to 56×56 without any crop for forward inference with a batch size of 1, and the runtime reported in this paper is the average among all test samples over three trials running on NVIDIA® GeForce® GTX 1080 (8 GB) GPU (Graphics Processing Unit) with CUDA® 8.0 and cuDNN 5.1 installed. The implementation is based on the framework Caffe.

CIFAR Dataset Classification

To train the whole DFB-Net on CIFAR-10, the learning rate starts from 0.004, and the total number of epochs is 180. More loss weight is given to earlier exit branches to encourage more discriminative feature learning in side branches. The loss weight 2.5 is attached to both side branches and 0.25 to main branch. In addition, dropout is not used in the whole DFB-Net training. Table 2 shows the forward inference results of DFB-Net. As shown in Table 2, the DFB-Net outperforms its baseline model when exit thresholds are set to (0.99, 0.975, 0.75) and gains 3× speedup. When the exit thresholds are raised to (0.99, 0.99, 0.75), the DFB-Net achieves state-of-the-art result with an error rate of 3.07% and still gains 2.85× speedup. Compared with B-ResNet, the DFB-Net is distinctly superior in three measures: (1) accuracy (79.19% vs. 96.93%), (2) speedup gains (1.9× vs. 2.85×), and (3) ratio of exit samples at the shortest branch (41.5% vs. 80.0%).

tation (random crops and/or horizontal flip). The DFB-Net outperforms existing state-of-the-art methods on both datasets with error rates of 3.07% on CIFAR-10 and 16.01% on CIFAR-100. Even better, running on GTX 1080 with a batch size of 1, the DFB-Net takes less than 10.5 ms, on average, to finish the forward inference on CIFAR-10, and less than 19 ms on CIFAR-100.

TABLE 2

Performance Results: CIFAR-10

| Network Topology | Exit Thresholds (Exit-1, Exit-2, Exit-3) | Error (%) | Time (ms) | Gain (x) | Exit Ratio (%) (Exit-1, Exit-2, Exit-3, Fused) | Error (%) within Each Branch (Exit-1, Exit-2, Exit-3, Fused) |
|---|---|---|---|---|---|---|
| (Baseline) WRN-50-N6-k6 | N/A | 3.23 | 29.67 | 1.00 | N/A | N/A |
| DFB-Net: | 0.900, 0.900, 0.00 | 3.72 | 7.39 | 4.01 | 90.48, 5.98, 3.54 | 1.90, 15.72, 29.94 |
| (Exit-1) Branch-1, 18 layers | 0.900, 0.900, 0.75 | 3.63 | 7.43 | 3.99 | 90.48, 5.98, 2.83, 0.71 | 1.90, 15.72, 23.32, 43.66 |
| (Exit-2) Branch-2, 38 layers | 0.950, 0.950, 0.00 | 3.54 | 8.21 | 3.61 | 87.50, 7.05, 5.45 | 1.37, 11.21, 28.44 |
| (Exit-3) Baseline, 50 layers | 0.950, 0.950, 0.75 | 3.39 | 8.22 | 3.61 | 87.50, 7.05, 4.50, 0.95 | 1.37, 11.21, 22.67, 40.00 |
| | 0.975, 0.975, 0.00 | 3.46 | 9.09 | 3.26 | 84.33, 8.27, 7.40 | 1.01, 7.86, 26.49 |
| | 0.975, 0.975, 0.75 | 3.29 | 9.14 | 3.25 | 84.33, 8.27, 6.30, 1.10 | 1.01, 7.86, 21.59, 39.09 |
| | 0.990, 0.975, 0.00 | 3.36 | 9.85 | 3.01 | 80.03, 11.53, 8.44 | 0.65, 5.98, 25.48 |
| | 0.990, 0.975, 0.75 | 3.15 | 9.89 | 3.00 | 80.03, 11.53, 7.22, 1.22 | 0.65, 5.98, 20.50, 37.70 |
| | 0.990, 0.990, 0.00 | 3.29 | 10.35 | 2.87 | 80.03, 9.48, 10.49 | 0.65, 4.11, 22.69 |
| | 0.990, 0.990, 0.75 | 3.07 | 10.41 | 2.85 | 80.03, 9.48, 9.19, 1.30 | 0.65, 4.11, 18.06, 38.46 |

Table 2. DFB-Net performance results on CIFAR-10 dataset (best view in color).

To train the whole DFB-Net on CIFAR-100, dropout is applied within each building block, and the learning rate starts from 0.025 for total 200 epochs. The loss weight 3.75 is placed on the first exit branch, the loss weight 2.5 is placed on on the second exit branch, and the loss weight 0.25 is placed on on the main branch. It should be noted that down-sampling is implemented by 2×2 average pooling with stride 2, then followed by the 1×1 and 3×3 convolutions with stride 1. Table 3 shows the forward inference results and establishes the same fact that the DFB-Net outperforms its baseline model again. In particular, the DFB-Net achieves lower error rates than the main branch does, when exit thresholds are set to (0.8, 0.75, 0.75), and gains 2.75× speedup. When the exit thresholds are raised to (0.99, 0.99, 0.75), the DFB-Net achieves state-of-the-art result with the error rate 16.01% and still gains 1.56× speedup.

TABLE 4

Table 4: Error rates (%) on CIFAR datasets compared with state-of-the-art methods.

| Model | Depth | Parameters | CIFAR-10 | CIFAR-100 |
|---|---|---|---|---|
| (pre-act) ResNet [6] | 1001 | 10.2M | 4.62 | 22.71 |
| Wide ResNet [7] | 28 | 36.5M | 3.89 | 18.85 |
| DenseNet-BC (k = 24) [8] | 250 | 15.3M | 3.62 | 17.60 |
| DenseNet-BC (k = 40) [8] | 190 | 25.6M | 3.46 | 17.18 |
| DFB-Net Baseline (ours) | 50 | 81.1M | 3.23 | 17.74 |
| DFB-Net (ours) | 18/38/50 | 106.2M | 3.07 | 16.01 |

TABLE 3

Performance Results: CIFAR-100

| Network Topology | Exit Thresholds (Exit-1, Exit-2, Exit-3) | Error (%) | Time (ms) | Gain (x) | Exit Ratio (%) (Exit-1, Exit-2, Exit-3, Fused) | Error (%) within Each Branch (Exit-1, Exit-2, Exit-3, Fused) |
|---|---|---|---|---|---|---|
| (Baseline) WRN-50-N6-k6 | N/A | 17.74 | 29.39 | 1.00 | N/A | N/A |
| DFB-Net: | 0.75, 0.75, 0.00 | 18.06 | 10.01 | 2.94 | 78.73, 11.47, 9.80 | 10.91, 34.70, 56.02 |
| (Exit-1) Branch-1, 18 layers | 0.75, 0.75, 0.75 | 17.89 | 10.02 | 2.93 | 78.73, 11.47, 4.38, 5.42 | 10.91, 34.70, 38.58, 66.97 |
| (Exit-2) Branch-2, 38 layers | 0.80, 0.75, 0.00 | 17.78 | 10.62 | 2.77 | 75.83, 13.43, 10.74 | 9.75, 33.43, 54.93 |
| (Exit-3) Baseline, 50 layers | 0.80, 0.75, 0.75 | 17.55 | 10.67 | 2.75 | 75.83, 13.43, 4.93, 5.81 | 9.75, 33.43, 37.93, 65.40 |
| | 0.85, 0.80, 0.00 | 17.34 | 11.51 | 2.55 | 72.62, 14.32, 13.06 | 8.39, 29.19, 54.13 |
| | 0.85, 0.80, 0.75 | 17.09 | 11.52 | 2.55 | 72.62, 14.32, 6.18, 6.88 | 8.39, 29.19, 37.70, 65.26 |
| | 0.90, 0.90, 0.00 | 16.94 | 13.04 | 2.25 | 68.64, 13.50, 17.86 | 6.98, 23.11, 50.56 |
| | 0.90, 0.90, 0.75 | 16.64 | 13.06 | 2.25 | 68.64, 13.50, 9.25, 8.61 | 6.98, 23.11, 35.35, 63.41 |
| | 0.95, 0.85, 0.00 | 16.64 | 13.77 | 2.13 | 62.61, 19.73, 17.66 | 4.87, 22.76, 51.53 |
| | 0.95, 0.85, 0.75 | 16.42 | 13.81 | 2.13 | 62.61, 19.73, 9.06, 8.60 | 4.87, 22.76, 36.53, 64.77 |
| | 0.99, 0.99, 0.00 | 16.60 | 18.81 | 1.56 | 50.79, 14.68, 34.53 | 2.30, 8.92, 40.89 |
| | 0.99, 0.99, 0.75 | 16.01 | 18.83 | 1.56 | 50.79, 14.68, 21.91, 12.62 | 2.30, 8.92, 27.89, 58.80 |

Table 3. DFB-Net performance results on CIFAR-100 dataset (best view in color).

Comparison with State-of-the-Art Methods

In Table 4, the error rates of the DFB-Net are compared with state-of-the-art methods. It should be noted that both scale and aspect ratio data augmentation are applied, while other methods listed in this table use common data augmen- The DFB-Net provides an intuitive, probability-based, exit-threshold setting for a flexible trade-off between inference time and accuracy. If an exit threshold of 0 is set to Exit-1, it only takes less than 5.5 ms for each forward inference, and still measures low error rates (5.74% on CIFAR-10, 21.61% on CIFAR-100). In addition, complete but smaller side branches strongly encourage a large portion of test samples to exit earlier and thus get a high speedup gain for fast inference. Furthermore, if a test sample fails to exceed any of the exit thresholds, making probability fusion provides a better collaborative prediction.

In addition, the illustrated DFB-Net (a convolutional neural network) is simply used to illustrate the benefit that can be achieved through the use of the structure of the side branches extending from the main branch of the deep neural network, and should not be used to limit the use of the structure of the "complete but smaller" side branches extending from the main branch of the deep neural network to the convolutional neural network. Other types of deep neural networks can also benefit from the use of the structure of the "complete but smaller" side branches extending from the main branch.

As mentioned, as embodied in the present application, the use of a "complete but smaller" structure for the side branch(es) (or sub-side branch(es), sub-sub-side branch(es), and so on) extending from the main branch (or side branch(es), sub-side branch(es), and so on), the sequential decision making mechanism, and the collaborating (fusing) decision making mechanism in a deep neural network would equip a deep neural network with the capability for fast forward inference so as to enhance recognition and classification accuracy and efficiency of the deep neural network.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for recognizing and classifying a media data as one of a plurality of pre-determined data classes using a deep neural network, comprising:
    a non-transitory computer-readable medium containing computer-executable instructions for recognizing and classifying the media data as the one of a plurality of pre-determined data classes using the deep neural network; and
    a processor configured to execute the computer-executable instructions,
    wherein the deep neural network comprises:
    a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer;
    at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \leq Y < X$;
    a fusion layer, wherein the classification layer of the main path and the classification layer of the at least one alternative path merge at the fusion layer; and
    a predictor configured to recognize and classify the media data as one of the plurality of pre-determined data classes corresponding to a final class likelihood,
    wherein the deep neural network directs the media data sequentially through one or more of the at least one alternative path and the main path one at a time until the final class likelihood is outputted, and outputs either a highest class likelihood of a first-ever one of the at least one alternative path and the main path that reaches or exceeds a corresponding class likelihood threshold or a highest fused class likelihood from the fusion layer based on the class likelihoods of two or more of any of the main path and the at least one alternative path that the media data has been directed through as the final class likelihood.

2. The system of claim 1, wherein the deep neural network does not direct the media data through the main path until the deep neural network has directed the media data sequentially through each of at least one alternative path.

3. The system of claim 2, wherein the at least one alternative path includes a plurality of alternative paths, the deep neural network does not direct the media data through the main path until the deep neural network has directed the media data sequentially through each of the plurality of alternative paths, and the deep neural network directs the media data sequentially through the plurality of alternative paths in a descending order of a length of the side branch of each of the plurality of alternative paths, and the length of the side branch of each of the plurality of alternative paths is a total number of the additional X-Y groups of layers of each of the plurality of alternative paths.

4. The system of claim 1, wherein when the deep neural network outputs the final class likelihood, the deep neural network stops directing the media data through rest of the at least one alternative path and the main path.

5. The system of claim 1, wherein
    the fuse layer computes a current fused class likelihood of the two or more of any of the main path and the at least one alternative path that the media data has been directed through for each of the plurality of pre-determined data classes only when the highest class likelihood of a current one of the at least one alternative path and the main path that the media data has been directed through does not reach or exceed the corresponding class likelihood threshold, and
    the fuse layer computes a next fused class likelihood of two or more of any of the main path and the at least one alternative path has been directed through for each of the plurality of pre-determined data classes only when the highest class likelihood of a next one of the at least one alternative path and the main path that the media data has been directed through does not reach or exceed the corresponding class likelihood threshold.

6. The system of claim 5, wherein
    the deep neural network directs the media data through the next one of the at least one alternative path and the main path when the current fused class likelihood of the two or more of any of the main path and the at least one alternative path has been directed through for each of the plurality of pre-determined data classes does not reach or exceed a corresponding class likelihood threshold, and the current one of the at least one alternative path extends from a $C^{th}$ group of layers of the X groups of layers of the main path, and the deep neural network directs the media data through the next one of the at least one alternative path and the main path by redirecting data outputted from the $C^{th}$ group of layers of the X groups of layers of the main path into a $(C+1)^{th}$ group of layers of the X groups of layers of the main path and then through rest of the layers of the next one of the at least one alternative path and the main path, wherein C is one of the respective Y of all of the at least one alternative path.

7. The system of claim 5, wherein the fusion layer computes the current fused class likelihood of the two or more of the at least one alternative path and the main path by one of for each of the plurality of pre-determined data classes, averaging the class likelihoods from the two or more of the at least one alternative path and the main path with a same weight on the class likelihoods from the two or more of the at least one alternative path and the main path;

for each of the plurality of pre-determined data classes, averaging the class likelihoods from the two or more of the at least one alternative path and the main path with respective weights on the class likelihoods from the two or more of the at least one alternative path and the main path;

for each of the plurality of pre-determined data classes, selecting a maximum class likelihood from the class likelihoods from the two or more of the at least one alternative path and the main path;

for each of the plurality of pre-determined data classes, randomly selecting a class likelihood from the class likelihoods from the two or more of the at least one alternative path and the main path; and for each of the plurality of pre-determined data classes, randomly dropping a predetermined number of the class likelihoods from the two or more of the at least one alternative path and the main path, and then performing one of (a)-(d).

8. The system of claim 1, wherein the class likelihood is represented in a form of a probability or a class score.

9. The system of claim 1, wherein the deep neural network outputs the highest fused class likelihood from the fusion layer as the final class likelihood only when the highest class likelihood of any previous one(s) of the at least one alternative path and the main path that the media data has been directed through does not reach or exceed the corresponding class likelihood threshold.

10. The system of claim 9, wherein the deep neural network outputs the highest fused class likelihood from the fusion layer as the final class likelihood only when the highest fused class likelihood reaches or exceeds a corresponding fused class likelihood threshold thereof or the deep neural network has directed the media data through each of the at least one alternative path and the main path.

11. The system of claim 1, wherein a total number of the layers in the X groups in any of the at least one alternative path is different from a total number of the layers of the X groups of layer in the main path.

12. The system of claim 11, wherein the total number of the layers in the X groups in any of the at least one alternative path is smaller than a total number of the layers of the X groups of layer in the main path.

13. The system of claim 12, wherein a total number of the layers of an $N^{th}$ group of layers in at least one of the at least one alternative path is smaller than a total number of the layers of an $N^{th}$ group of layers in the main path, and wherein N>Y and N is an integer of at least one of Y+1, Y+2, ..., X.

14. The system of claim 1, wherein each layer in each of the main path and the at least one alternative path includes a plurality of filters, and a total number of the filters of the X groups of layers in any of the at least one alternative path is different from a total number of the filters of the X groups of layers in the main path.

15. The system of claim 14, wherein the total number of the filters of the X groups of layers in any of the at least one alternative path is smaller than the total number of the filters of the X groups of layers in the main path.

16. The system of claim 15, wherein a total number of the filters of a $K^{th}$ group of layers in at least one of the at least one alternative path is smaller than a total number of the filters of a $K^{th}$ group of layers in the main path, and wherein K>Y and K is an integer of at least one of Y+1, Y+2, ..., X.

17. The system of claim 14, wherein each layer in the same group of layers in the main path has a same total number of filters, and each layer in the same group of layers in any of the at least one alternative path has a same total number of filters.

18. The system of claim 1, wherein the deep neural network is a convolutional neural network.

19. The system of claim 1, wherein the media data is a text data, a graphic data, an image data, an audio data, a video data, or any combination thereof.

20. The system of claim 19, wherein the media data is an image data or a video data showing a portion of a product to be inspected, and the plurality of pre-determined data classes include being defective and being non-defective.

21. The system of claim 1, wherein the at least one alternative path includes a plurality of alternative paths, and at least one sub-side branch with additional X-Y-W groups of layers extends from a respective $W^{th}$ group of the additional X-Y groups of layers of the side branch to form a part of another one of the at least one alternative path with the at least one sub-side branch, and wherein the respective W for each of the at least one sub-side branch is an integer and 1≤W<X-Y.

22. The system of claim 21, wherein the deep neural network does not direct the media data through the alternative path with the side branch until the deep neural network has directed the media data sequentially through each of at least one alternative path with the at least one sub-side branch.

23. The system of claim 21, wherein the at least one sub-side branch includes a plurality of sub-side branches that respectively form a part of a plurality of alternative paths with the sub-side branches, the deep neural network does not direct the media data through the alternative path with the side branch until the deep neural network has directed the media data sequentially through each of the plurality of alternative paths with the sub-side branches, and the deep neural network directs the media data sequentially through the plurality of alternative paths with the sub-side branches in a descending order of a length of the sub-side branch of each of the plurality of alternative paths with the sub-side branches, and the length of the sub-side branch of each of the plurality of alternative paths with the sub-side branches is a total number of the additional X-Y-W groups of layers of each of the plurality of alternative paths with the sub-side branches.

24. The system of claim 23, wherein
the deep neural network directs the media data through a next one of the plurality of alternative paths with the sub-side branches and the alternative path with the side branch when the media data is through a current one of the plurality of alternative paths with the sub-side branches without outputting the final class likelihood, and
the current one of the plurality of alternative paths with the sub-side branches extends from a $V^{th}$ group of layers of the X-Y groups of layers of the alternative path with the side branch, and the deep neural network directs the media data through the next one of the plurality of alternative paths with the sub-side branches and the alternative path with the side branch by redirecting data outputted from the $V^{th}$ group of layers of the X groups of layers of the alternative path with the side branch into a $(V+1)^{th}$ group of layers of the X groups of layers of the alternative path with the side branch and then through rest of the layers of the next one of the plurality of alternative paths with the sub-side branches and the alternative path with the side branch, wherein V is one of the respective W of all of the at least one sub-side branch.

25. A method for recognizing and classifying a media data as one of a plurality of pre-determined data classes using a deep neural network,
the deep neural network comprising:
a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer;
at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \leq Y < X$;
a fusion layer, wherein the classification layer of the main path and the classification layer of the at least one alternative path merge at the fusion layer; and
a predictor configured to recognize and classify the media data as one of the plurality of pre-determined data classes corresponding to a final class likelihood, the method comprising:
directing the media data sequentially through one or more of the at least one alternative path and the main path one at a time until the final class likelihood is outputted;
outputting either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood; and
recognizing and classifying the media data as one of the plurality of pre-determined data classes corresponding to the final class likelihood.

26. The method of claim 25, further comprising not directing the media data through the main path until the deep neural network has directed the media data sequentially through each of at least one alternative path.

27. The method of claim 26, wherein the at least one alternative path includes a plurality of alternative paths, and the method further comprising:
not directing the media data through the main path until the deep neural network has directed the media data sequentially through each of the plurality of alternative paths; and
directing the media data sequentially through the plurality of alternative paths in a descending order of a length of the side branch of each of the plurality of alternative paths,
wherein the length of the side branch of each of the plurality of alternative paths is a total number of the additional X-Y groups of layers of each of the plurality of alternative paths.

28. The method of claim 25, further comprising: when the deep neural network outputs the final class likelihood, stopping directing the media data through rest of the at least one alternative path and the main path.

29. The method of claim 25, further comprising:
computing by the fuse layer a current fused class likelihood of the two or more of any of the main path and the at least one alternative path that the media data has been directed through for each of the plurality of pre-determined data classes only when the highest class likelihood of a current one of the at least one alternative path and the main path that the media data has been directed through does not reach or exceed the corresponding class likelihood threshold; and
computing by the fuse layer a next fused class likelihood of two or more of any of the main path and the at least one alternative path has been directed through for each of the plurality of pre-determined data classes only when the highest class likelihood of a next one of the at least one alternative path and the main path that the media data has been directed through does not reach or exceed the corresponding class likelihood threshold.

30. The method of claim 29, further comprising:
directing the media data through the next one of the at least one alternative path and the main path when the current fused class likelihood of the two or more of any of the main path and the at least one alternative path has been directed through for each of the plurality of pre-determined data classes does not reach or exceed a corresponding class likelihood threshold; and
directing the media data through the next one of the at least one alternative path and the main path by redirecting data outputted from a $C^{th}$ group of layers of the X groups of layers of the main path into a $(C+1)^{th}$ group of layers of the X groups of layers of the main path and then through rest of the layers of the next one of the at least one alternative path and the main path, wherein C is one of the respective Y of all of the at least one alternative path, and the current one of the at least one alternative path extends from the $C^{th}$ group of layers of the X groups of layers of the main path.

31. The method of claim 25, further comprising outputting the highest fused class likelihood from the fusion layer as the final class likelihood only when the highest class likelihood of any previous one(s) of the at least one alternative path and the main path that the media data has been directed through does not reach or exceed the corresponding class likelihood threshold.

32. The method of claim 31, further comprising outputting the highest fused class likelihood from the fusion layer as the final class likelihood only when the highest fused class likelihood reaches or exceeds a corresponding fused class likelihood threshold thereof or the deep neural network has directed the media data through each of the at least one alternative path and the main path.

33. The method of claim 25, wherein a total number of the layers in the X groups in any of the at least one alternative path is smaller than a total number of the layers of the X groups of layer in the main path.

34. The method of claim 33, wherein a total number of the layers of an $N^{th}$ group of layers in at least one of the at least one alternative path is smaller than a total number of the layers of an $N^{th}$ group of layers in the main path, and wherein N>Y and N is an integer of at least one of Y+1, Y+2, ..., X.

35. The method of claim 25, wherein each layer in each of the main path and the at least one alternative path includes a plurality of filters, a total number of the filters of the X groups of layers in any of the at least one alternative path is smaller than a total number of the filters of the X groups of layers in the main path.

36. The method of claim 35, wherein a total number of the filters of a $K^{th}$ group of layers in at least one of the at least one alternative path is smaller than a total number of the filters of a $K^{th}$ group of layers in the main path, and wherein K>Y and K is an integer of at least one of Y+1, Y+2, ..., X.

37. The method of claim 35, wherein each layer in the same group of layers in the main path has a same total number of filters, and each layer in the same group of layers in any of the at least one alternative path has a same total number of filters.

38. The method of claim 25, wherein the at least one alternative path includes a plurality of alternative paths, and at least one sub-side branch with additional X-Y-W groups of layers extends from a respective $W^{th}$ group of the additional X-Y groups of layers of the side branch to form a part of another one of the at least one alternative path with the at least one sub-side branch, and wherein the respective W for each of the at least one sub-side branch is an integer and 1≤W<X-Y.

39. The method of claim 38, further comprising not directing the media data through the alternative path with the side branch until the deep neural network has directed the media data sequentially through each of at least one alternative path with the at least one sub-side branch.

40. The method of claim 38, wherein the at least one sub-side branch includes a plurality of sub-side branches that respectively form a part of a plurality of alternative paths with the sub-side branches, the method further comprising:
not directing the media data through the alternative path with the side branch until the deep neural network has directed the media data sequentially through each of the plurality of alternative paths with the sub-side branches; and
directing the media data sequentially through the plurality of alternative paths with the sub-side branches in a descending order of a length of the sub-side branch of each of the plurality of alternative paths with the sub-side branches,
wherein the length of the sub-side branch of each of the plurality of alternative paths with the sub-side branches is a total number of the additional X-Y-W groups of layers of each of the plurality of alternative paths with the sub-side branches.

41. The method of claim 40, further comprising:
directing the media data through a next one of the plurality of alternative paths with the sub-side branches and the alternative path with the side branch when the media data is through a current one of the plurality of alternative paths with the sub-side branches without outputting the final class likelihood; and
directing the media data through the next one of the plurality of alternative paths with the sub-side branches and the alternative path with the side branch by redirecting data outputted from a $V^{th}$ group of layers of the X groups of layers of the alternative path with the side branch into a $(V+1)^{th}$ group of layers of the X groups of layers of the alternative path with the side branch and then through rest of the layers of the next one of the plurality of alternative paths with the sub-side branches and the alternative path with the side branch, wherein V is one of the respective W of all of the at least one sub-side branch, and the current one of the plurality of alternative paths with the sub-side branches extends from the $V^{th}$ group of layers of the X-Y groups of layers of the alternative path with the side branch.

42. A non-transitory computer-readable medium containing a computer program product comprising computer-executable instructions for recognizing and classifying a media data as one of a plurality of pre-determined data classes using a deep neural network,
the deep neural network comprising:
a main path in a sequential order of an input layer for receiving a media data, only X groups of layers for extracting features from the media data, at least one pooling layer for downsampling an output from the X groups of layers in the main path, and a classification layer for computing a class likelihood for each of the plurality of pre-determined data classes for the media data through the main path, wherein X>1 and X is an integer;
at least one alternative path in a sequential order of the input layer, only X groups of layers for extracting features from the media data, at least one pooling layer for downsampling an output from the X groups in the at least one alternative path, and a classification layer for computing a class likelihood for each of the plurality of pre-determined data classes for the media data through the at least one alternative path, wherein the X groups of layers in each of the at least one alternative path consist of respective Y groups of the X groups of layers in the main path, and additional X-Y groups of layers as a side branch extending from a respective $Y^{th}$ group of the X groups in the main path, wherein the respective Y groups of the X groups of layers in the main path are a first group of the X groups of layers in the main path through the respective $Y^{th}$ group of the X groups of layers in the main path and wherein the respective Y for each of the at least one alternative path is an integer and $1 \leq Y < X$;

a fusion layer, wherein the classification layer of the main path and the classification layer of the at least one alternative path merge at the fusion layer; and a predictor configured to recognize and classify the media data as one of the plurality of pre-determined data classes corresponding to a final class likelihood, the computer program product comprising the computer-executable instructions for:

directing the media data sequentially through one or more of the at least one alternative path and the main path one at a time until the final class likelihood is outputted;

outputting either a highest class likelihood of a first-ever one of the at least one alternative path and main path that reaches or exceeds a corresponding class likelihood threshold or a highest fused class likelihood from the fusion layer based on the class likelihoods of two or more of any of the main path and the at least one alternative path that the media data has been directed through as the final class likelihood; and recognizing and classifying the media data as one of the plurality of pre-determined data classes corresponding to the final class likelihood.

* * * * *